(12) United States Patent
Nakamura

(10) Patent No.: US 8,857,647 B2
(45) Date of Patent: Oct. 14, 2014

(54) CONNECTING STRUCTURE

(76) Inventor: Kohei Nakamura, Hokkaido (JP)

( * ) Notice: Subject to any disclaimer, the term of this patent is extended or adjusted under 35 U.S.C. 154(b) by 129 days.

(21) Appl. No.: 12/995,019

(22) PCT Filed: May 29, 2009

(86) PCT No.: PCT/JP2009/059896
§ 371 (c)(1),
(2), (4) Date: Nov. 29, 2010

(87) PCT Pub. No.: WO2009/145317
PCT Pub. Date: Dec. 3, 2009

(65) Prior Publication Data
US 2011/0079573 A1    Apr. 7, 2011

(30) Foreign Application Priority Data

May 30, 2008    (JP) .................. 2008-143011

(51) Int. Cl.
| | | |
|---|---|---|
| B65D 41/06 | (2006.01) | |
| B65D 41/04 | (2006.01) | |
| F16B 21/04 | (2006.01) | |
| F16K 15/20 | (2006.01) | |
| F16B 21/16 | (2006.01) | |
| B65D 43/02 | (2006.01) | |
| B65D 21/02 | (2006.01) | |
| A44B 1/32 | (2006.01) | |

(52) U.S. Cl.
CPC ............... *B65D 41/04* (2013.01); *F16B 21/04* (2013.01); *F16K 15/20* (2013.01); *F16B 21/165* (2013.01); *B65D 43/0231* (2013.01); *B65D 21/0231* (2013.01); *B65D 41/0485* (2013.01); *A44B 1/32* (2013.01)
USPC ........... 220/290; 220/293; 220/298; 220/301; 215/332; 215/337

(58) Field of Classification Search
USPC .......... 215/332, 337, 339; 220/290, 293, 294, 220/298, 301; 206/823, 581
See application file for complete search history.

(56) References Cited

U.S. PATENT DOCUMENTS 1,509,969 A * 9/1924 Martin ........................... 220/301
1,611,443 A * 12/1926 Hothersall .................... 222/542
(Continued)

FOREIGN PATENT DOCUMENTS

DE   19738263 A1   3/1999
EP    0110796 A1   6/1984
(Continued)

OTHER PUBLICATIONS

International Search Report for international application No. PCT/JP2009/059896 issued by the Japanese Patent Office on Sep. 1, 2009.

*Primary Examiner* — Fenn Mathew
*Assistant Examiner* — Jennifer Castriotta
(74) *Attorney, Agent, or Firm* — RatnerPrestia

(57) ABSTRACT

Disclosed is a connecting structure for connecting a first member and a second member, wherein the first member comprises a connecting upright portion and a plurality of locking flanges provided to extend outwards along the circumferential direction of the outer face of the connecting upright portion, while the second member comprises a connecting side-wall portion that overlies the connecting upright portion and a plurality of locking projections provided to extend inwards from the inner face of the connecting sidewall portion. The bottom faces of the locking flanges distend downwards in a convex curved shape and, when the second member is overlaid on the first member and rotated, the upper faces of the locking projections are guided with sliding contact along the convex curved bottom faces of the locking flanges and stopped at the lowermost position of the convex curved bottom faces.

6 Claims, 21 Drawing Sheets

(56) References Cited

U.S. PATENT DOCUMENTS

| | | | |
|---|---|---|---|
| 2,193,226 A * | 3/1940 | Deletzke | 215/295 |
| 3,402,842 A * | 9/1968 | Millian | 215/217 |
| 3,809,276 A * | 5/1974 | Landen | 215/332 |
| 4,006,837 A * | 2/1977 | Gates et al. | 215/340 |
| 4,482,073 A * | 11/1984 | Gagliardi | 215/332 |
| 4,485,932 A * | 12/1984 | Kusz | 215/222 |
| 4,701,360 A | 10/1987 | Gibbons et al. | |
| 4,944,424 A | 7/1990 | Wood, Jr. | |
| 5,638,976 A * | 6/1997 | Arnold | 220/298 |
| 5,715,960 A * | 2/1998 | Seymour | 215/295 |
| 6,227,391 B1 * | 5/2001 | King | 215/307 |
| 6,523,709 B2 | 2/2003 | Miceli et al. | 215/228 |
| 7,165,692 B2 * | 1/2007 | Konefal et al. | 215/220 |
| 7,387,214 B1 * | 6/2008 | Shingle | 215/222 |
| 7,832,578 B1 * | 11/2010 | Willis et al. | 215/222 |
| 2002/0190022 A1 | 12/2002 | Pitassi | |
| 2006/0029455 A1 * | 2/2006 | Baines et al. | 401/21 |

FOREIGN PATENT DOCUMENTS

| | | |
|---|---|---|
| GB | 319868 | 10/1929 |
| GB | 2273493 A | 6/1994 |
| JP | 48-020111 | 3/1973 |
| JP | 51-151436 | 12/1976 |
| JP | U1985-126342 | 8/1985 |
| JP | 62-126375 | 8/1987 |
| JP | 63-003949 | 1/1988 |
| JP | 63-003950 | 1/1988 |
| JP | 64-013610 | 1/1989 |
| JP | 08-113251 | 5/1996 |
| JP | 10-305853 | 11/1998 |
| JP | 10-305854 | 11/1998 |
| JP | 11-100051 | 4/1999 |
| JP | 11-100052 | 4/1999 |
| JP | 11-105898 | 4/1999 |
| JP | 11-105899 | 4/1999 |
| JP | 2000-39455 | 2/2000 |
| JP | 2000-053150 | 2/2000 |
| JP | 2001-039455 | 2/2001 |
| JP | 2002-179108 | 6/2002 |
| JP | 2004-35011 | 2/2004 |

* cited by examiner

Fig.8
(a)
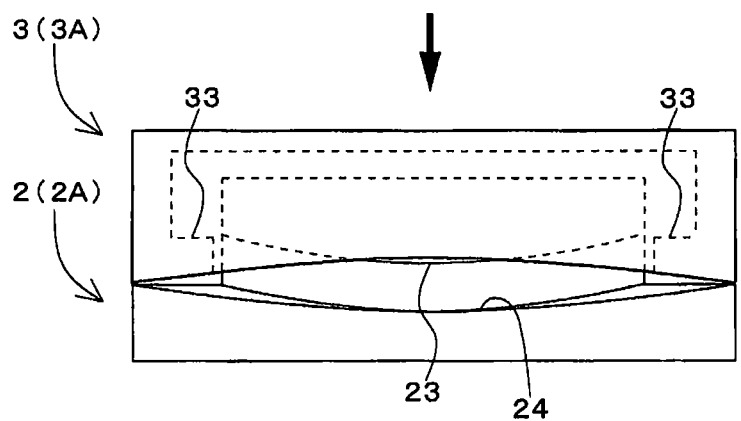
(b)
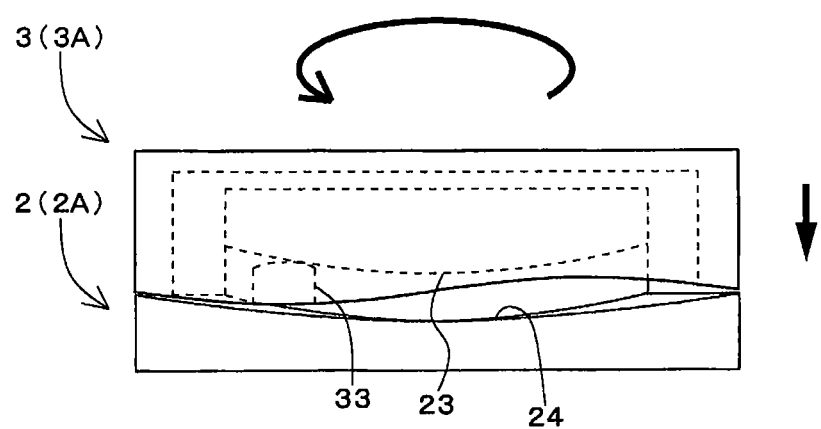
(c)
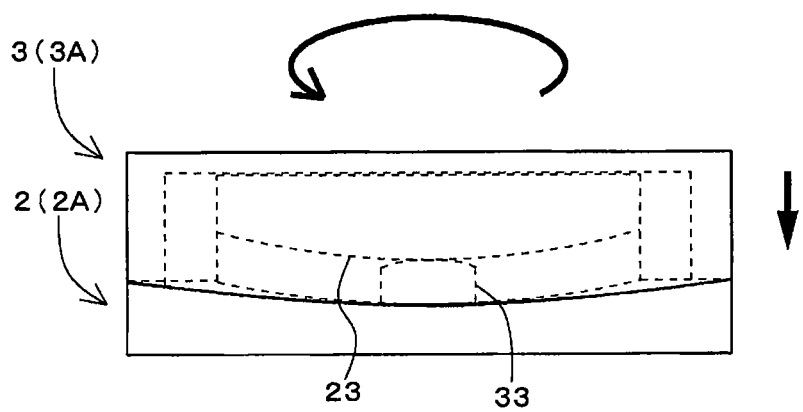

Fig.12
(a)
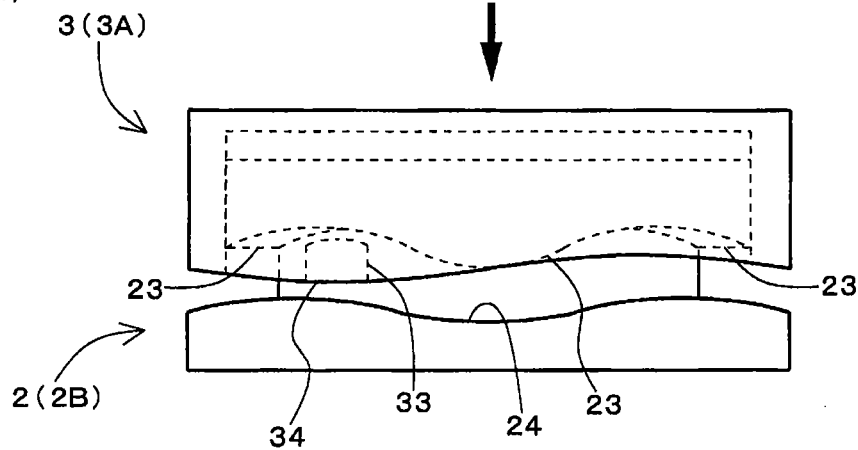
(b)
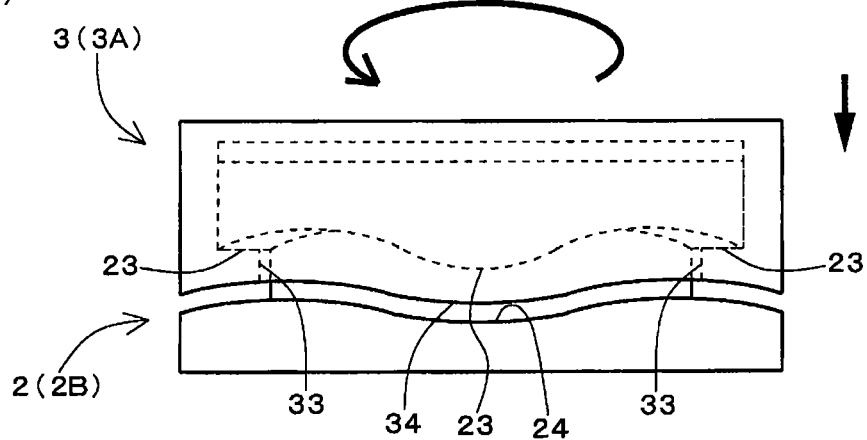
(c)
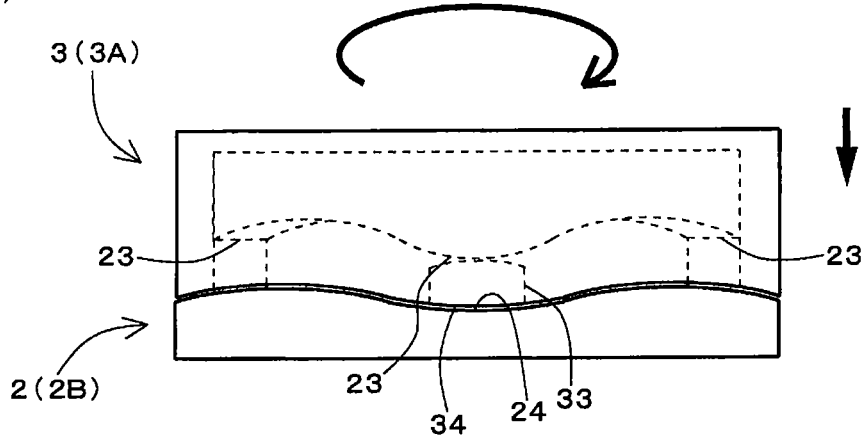

Fig.27
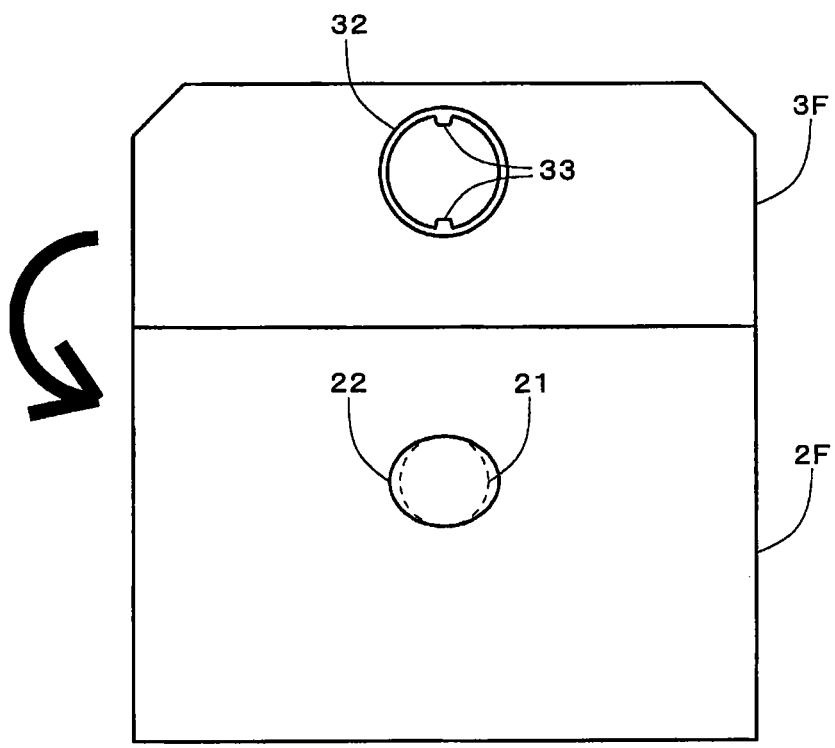
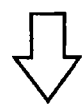
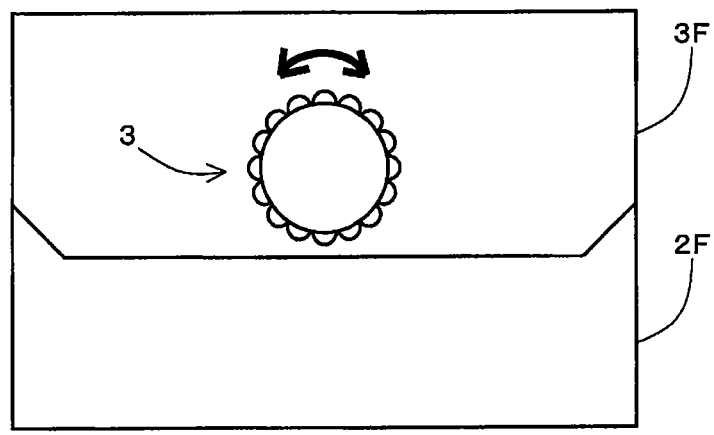

CONNECTING STRUCTURE

CROSS REFERENCE TO RELATED APPLICATIONS

This application is a U.S. national application of PCT International Application PCT/JP2009/059896, filed May 29, 2009, which claims priority to Japanese Application No. 2008-143011, filed May 30, 2008, the contents of each of which are incorporated by reference in their entirety for all purposes.

FIELD OF THE INVENTION

The present invention relates to a connecting structure for connecting a first member and a second member, and particularly to a connecting structure which is suitable for use in connecting a lid body to an opening of a container body such as a plastic bottle and water play equipment which can contain gas or liquid, and connecting various members as a pair of members to be locked therebetween such as a clasp of a bag and a button.

BACKGROUND OF THE INVENTION

A connecting structure for connecting a lid body to an opening of a container, etc. is proposed in conventional techniques. For example, Japanese Unexamined Patent Application Publication No. 2004-35011 discloses a screw-cap type hermetic container, in which a plurality of spiral threads are formed on the neck of a hollow container body, starting portions of each of the spiral threads are formed at intervals in the circumferential direction of the neck, and the width of the thread in front-end portion including the starting portions of each of the spiral threads are formed to be slightly narrower than that of the threads in rear-end portion (Patent Document 1).

The connecting structures described in the Japanese Unexamined Patent Application Publications No. 2000-53150 and 2001-39455 are provided with a plurality of projections on the inner circumferential surface of a lid body, and a curved groove which guides the projections are formed on the outer circumferential surface of a spout of the container (Patent Documents 2 and 3). By rotating said lid body with respect to the spout, each of the projections moves in the curved groove to open/close the lid body.

Patent Document 1: Japanese Unexamined Patent Application Publication No. 2004-35011
Patent Document 2: Japanese Unexamined Patent Application Publication No. 2000-53150
Patent Document 3: Japanese Unexamined Patent Application Publication No. 2001-39455

SUMMARY OF THE INVENTION

However, conventional screw-type connecting structures, including an invention disclosed in the above Patent Document 1, are characterized in that a lid is screwed to be opened/closed in a prescribed direction. Thus, if a user is careless about a rotating direction of a lid body to open/close the same, the lid body would be rotated in an opposite direction, resulting in wrong and bothersome operation. In particular, left-handers have difficulty opening/closing the lid body on most occasions. In addition, a screw-type connecting structure requires at least 2 or 3 rotations to completely fasten a lid body, which can cause children, the elderly and manually disabled persons an onerous operational problem.

Meanwhile, the inventions in Patent Documents 2 and 3 describe a lid which can be closed by slight rotation, in which a projection is guided along a thin groove, and the width of the groove and the diameter of the projection are formed to be almost identical. In operation, as a lid is rotated, the projection and the groove can generate a significant friction, leading to a difficulty in smoothly opening/closing the lid. Since the invention in Patent Document 2 is particularly designed to slide down a lid up to a deep position by slight rotation, a groove which guides a projection is formed on a steep slant. Consequently, frictional resistance with respect to rotation is increased and the lid can readily come off due to reduced friction with respect to upward force.

Also, a groove described in Patent Documents 2 and 3 allows sand or dust to enter inside thereof, thereby making it difficult to remove such a foreign substance. Specifically, sand or dust comes to a contact surface between a groove and a projection and prevents smooth sliding therebetween, resulting in a problem of looser connecting portion or increase in friction when closing a lid. This problem can be more serious, particularly in case of a connecting member in need of high airtightness and powerful connecting force such as a container requiring high precision in the width of the groove and the width of the projection. Also, this problem must be solved, particularly in cases where a connecting member is used in play equipment at the sea, a valve for injecting air into automobile tires, etc.

Furthermore, all of the connecting structures in said Patent Documents cause a difficulty in finding out a state of connection from the appearance, specifically, it is impossible to immediately determine whether a lid is completely closed or not. In external appearance, the lid is not provided with functional designs, and there is no technical innovation which can improve an aesthetic sense.

To solve the aforementioned problem, it is, therefore, one object of the present invention to provide a connecting structure which can be connected by slight rotation of a second member with respect to a first member in either direction, and which is tolerant of use in many environments including sandy or dusty environment.

Means for Solving the Problem

A connecting structure according to the present invention is a connecting structure for connecting a first member and a second member. Said first member comprises a connecting upright portion which is projected in a substantially cylindrical shape and a plurality of locking flanges provided to extend outwards along the circumferential direction of the outer side surface of the connecting upright portion, whereas said second member comprises a connecting side-wall portion which overlies said connecting upright portion and a plurality of locking projections provided to extend inwards from the inner side surface of the connecting side-wall portion. Said a plurality of locking flanges comprise no groove, and bottom faces thereof distend downwards in a convex curved shape and are continuously arranged so that a continuous track is formed along the circumferential direction of said connecting upright portion. When said second member overlies said first member to be rotated, upper faces of said locking projections slide and contact with convex curved bottom faces of said locking flanges to be guided on said track and locked at the lowermost position of the convex curved bottom faces.

In this invention, said locking flanges may be formed in a convex curved shape so that an outer edge shape thereof is extended most outwards at said lowermost position and formed in a symmetrical shape centering around said lowermost position.

In addition, in this invention, said first member comprises two or more groups of locking flanges whose locking forces vary, composed of a plurality of locking flanges provided in a positional relationship to be reciprocally engageable with said locking projections. Each of the groups of locking flanges may be continuously arranged so that all convex curved bottom faces form a continuous track along the circumferential direction of said connecting upright portion, and formed so that a dimension from an upper end surface of said connecting upright portion to the lowermost position of said convex curved bottom faces varies according to groups of locking flanges.

In this invention, said first member may comprise a plurality of concave curved joint surfaces formed according to shape and position of the convex curved bottom faces of said a plurality of locking flanges at a base-side circumferential part of the connecting upright portion, and said second member may comprise a plurality of convex curved joint surfaces formed according to shape and position of said concave curved joint surface on bottom faces of the connecting sidewall portion.

Also, in this invention, said first member may be configured as a container body having an opening, may be formed so that a circumferential edge of said opening is projected as said connecting upright portion, and said second member may be configured as a detachable lid on said opening.

Advantageous Effect of the Invention

The present invention can provide a connecting structure which can be connected by slight rotation of a second member with respect to a first member in either direction, and which is tolerant of use in many environments including sandy and dusty environment.

BRIEF DESCRIPTION OF THE DRAWINGS

FIG. 8 is an explanatory drawing in cases where a second member is connected to a first member in this first embodiment.
FIG. 12 is an explanatory drawing in cases where a second member is connected to a first member in this second embodiment.
FIG. 27 is a diagram showing Example 4 in which a connecting structure according to the present invention is applied to connection between a bag and covering lid.

Figure 1:
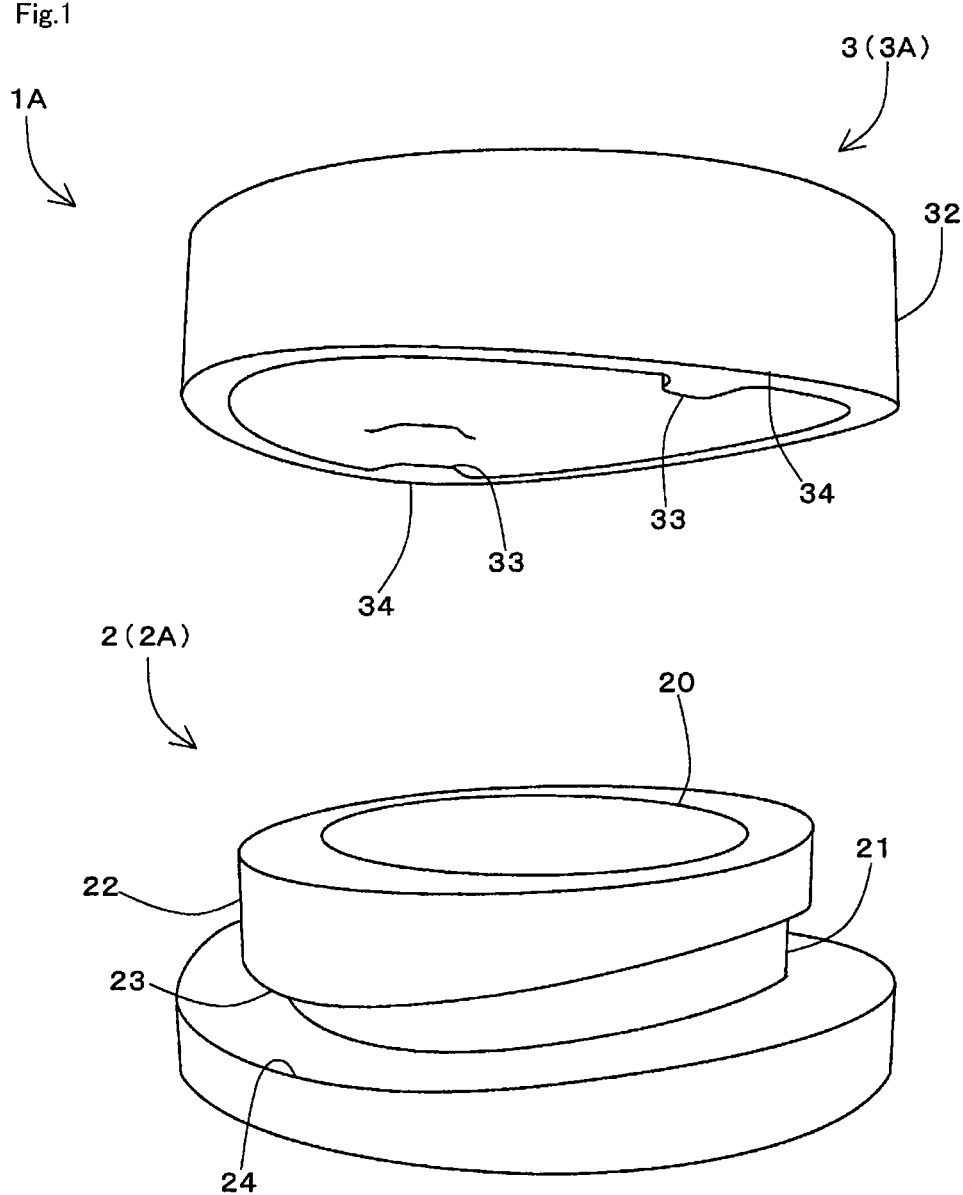
FIG. 1 is a perspective view showing a first embodiment of a connecting structure according to the present invention.

EXPLANATION OF LETTERS OR NUMERALS 1A,1B,1C Connecting structure
2 First member
2A,2B Container body
2D Gaseous structure
2E Plastic bottle
2F Bag body
2G Base portion
2H Electrical appliance
2I Button base
3 Second member
3A,3C Lid body
3D Adapter
3E Cap
3F Covering lid
3G Ornament portion
3H Connecting plug 31 Rotary button
4 Flat valve device
20 Opening
21 Connecting upright portion
22 Locking flanges
23 Convex curved bottom faces
24 Concave curved joint surface
25 Groups of weakly locking flanges
26 Groups of strongly locking flanges
27 Insertion hole
31 Lid portion
32 Connecting side-wall portion
33 Locking projections
34 Convex curved joint surface
35 Sealing member
36 Lid-side gas injecting hole
37 Connecting projection
38 Circular concave portion
39 Metal fitting for electric conduction
41 External frame member
42 Body member
43 Rotary lid
43a Gas injecting hole
44 Valve mechanism
44a Hermetic lid
51 Biasing member
52 Lock ball
53 Lock hole
B1 Bag body
B2 Covering lid
C Cap
H Button hole
P Plastic bottle
S Rotatably supporting member
T Rotary knob

DETAILED DESCRIPTION OF THE INVENTION

An embodiment which is applied to a container and a lid body as an example of a connecting structure according to the present invention will be described with reference to the drawings. FIG. 1 is a perspective view showing a connecting structure 1A of this first embodiment.

As shown in FIG. 1, the connecting structure 1A of this first embodiment mainly comprises a container body 2A as a first member 2 having an opening 20 and a lid body 3A as a second member 3 which is attached to or detached from the opening 20 of the container body 2A.

Herein, "container" generally means something to keep things in, but in this first embodiment, something for keeping gas, liquid, solid, etc. in, structures and so on via a prescribed opening 20, like water sporting goods such as rubber dinghy and inner tube, play equipment filled with air, automobile tires, bicycle tires and beverage containers such as plastic bottles and aluminum cans.

Figure 2:
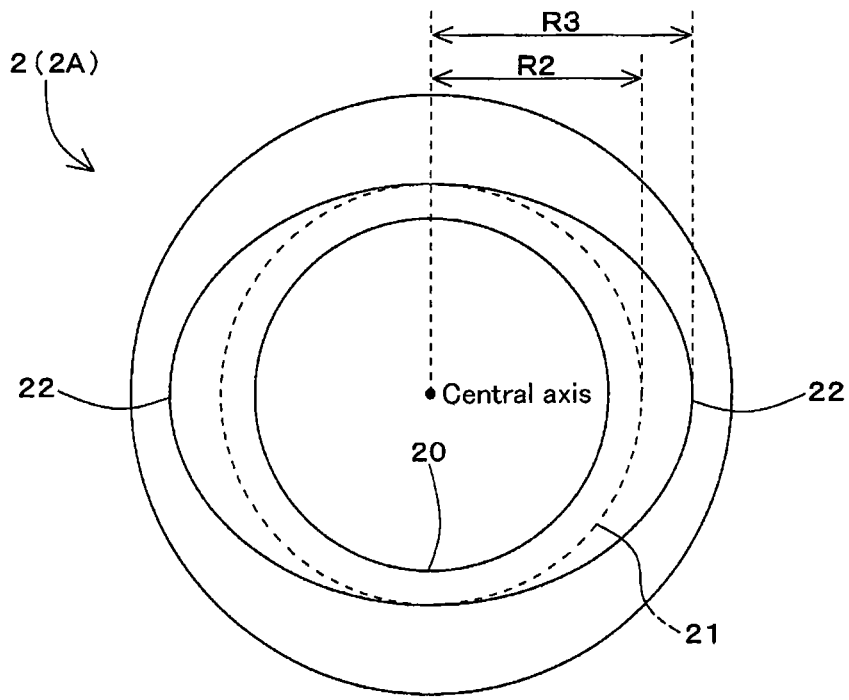
FIG. 2 is a plan view showing a first member in this first embodiment.

Each component will be described as follows. The first member 2 comprises, as shown in FIGS. 2 to 4, a connecting upright portion 21 which is projected in a substantially cylindrical shape and locking flanges 22 which are extended outwards from the outer side surface of the connecting upright portion 21.

The connecting upright portion 21 connects the second member 3 and rises from the container body 2A in a substantially cylindrical shape. In this first embodiment, as shown in FIGS. 1 to 4, a circumferential edge of the opening 20 is projected as the connecting upright portion 21 and formed in a substantially cylindrical shape. The connecting upright portion 21 may not be formed in a perfect cylindrical shape as long as it can be connected to the second member 3, and may be modified accordingly.

The locking flanges 22 connectably lock the second member 3, and are extended outwards from the outer side surface of the connecting upright portion 21. In this first embodiment, as shown in FIG. 2, two locking flanges 22,22 are formed at symmetrical positions with respect to the central axis of the opening 20. The locking flanges 22 are not limited thereto in number and arrangement as long as they may be provided in plural number along the circumferential direction of the outer side surface of the connecting upright portion 21.

Figure 3:
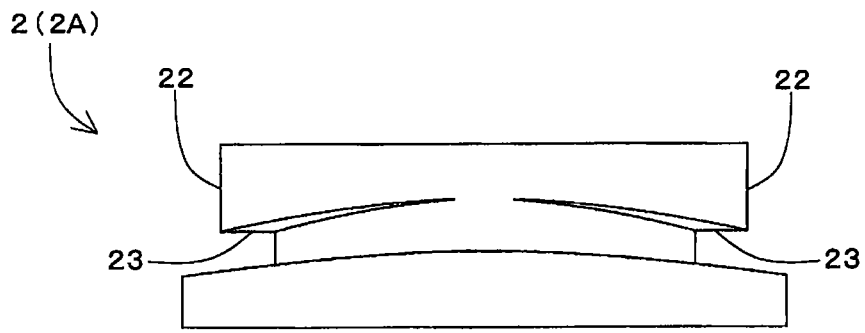
FIG. 3 is an elevational view of FIG. 2.
Figure 4:
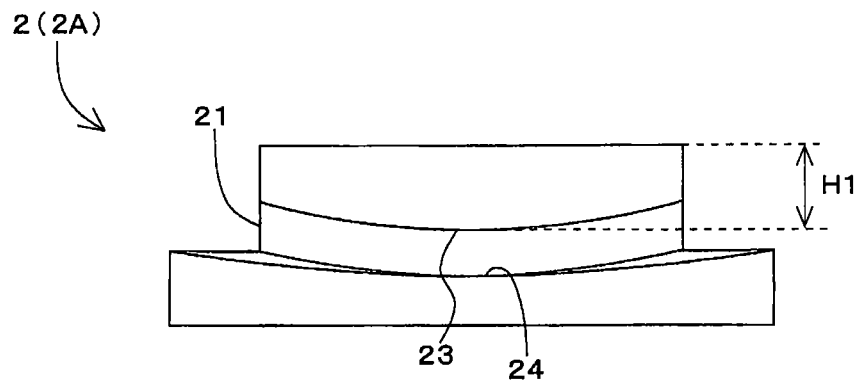
FIG. 4 is a side view of FIG. 2.

As shown in FIGS. 3 and 4, each of bottom faces of the locking flanges 22 is configured as convex curved bottom faces 23 which distend downwards in a convex curved shape. Each of the convex curved bottom faces 23 is provided with an almost identical height. In this first embodiment, each of the convex curved bottom faces 23 is formed in a symmetrical shape centering around the lowermost position to guide locking projections 33 of the second member 3 into the lowermost position with sliding contact thereof as described later.

In this first embodiment, each of the locking flanges 22, as shown in FIG. 2, is formed in a convex curved shape so that an outer edge shape thereof is extended most outwards at the lowermost position, and formed symmetrically centering around the lowermost position. In other words, a perfect flange shape is not extended between the locking flanges 22 to readily engage with said locking projections 33. The degree of extension slowly becomes higher up to the lowermost position as said locking projections 33 are guided thereinto, and locked at said lowermost position most firmly.

Figure 5:
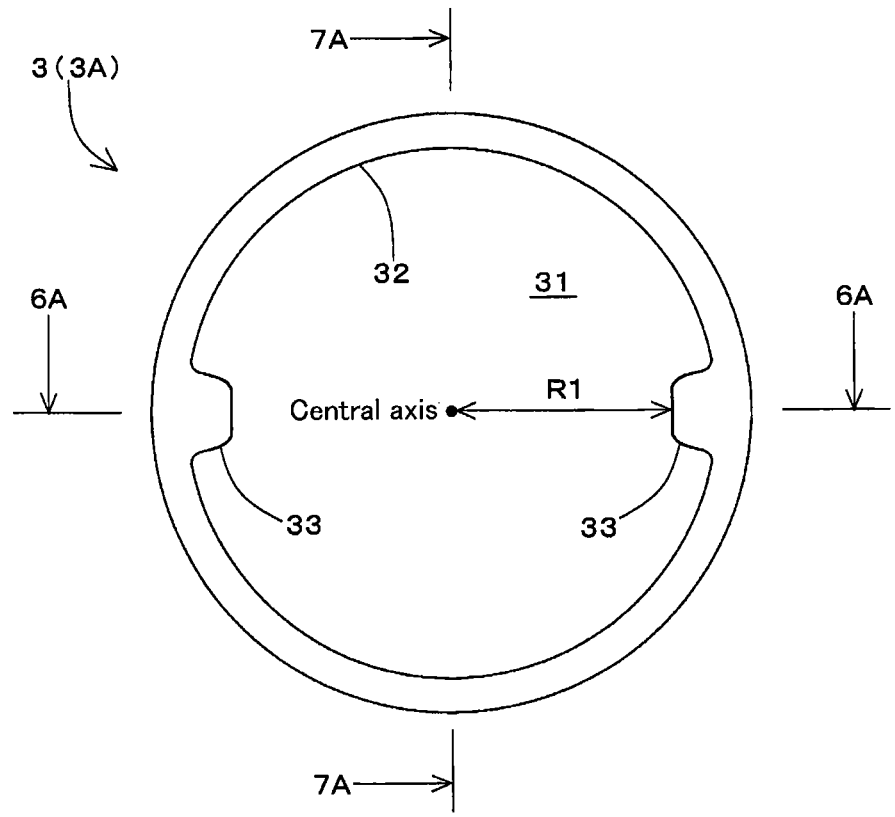
FIG. 5 is a bottom view showing a second member in this first embodiment.
Figure 6:
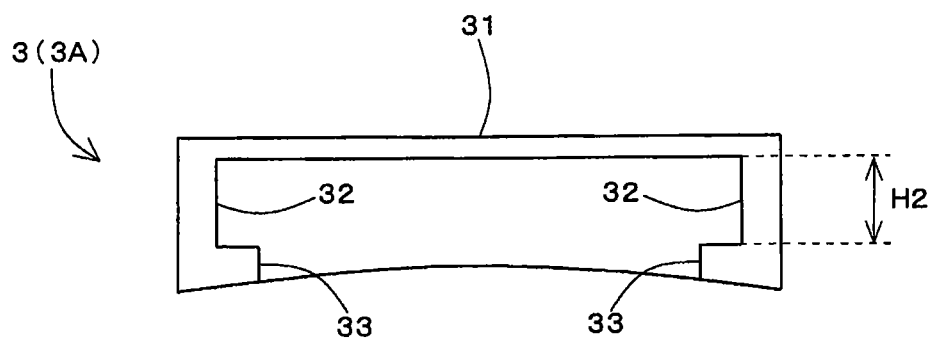
FIG. 6 is a sectional view taken along the line 6A-6A of FIG. 5.
Figure 7:
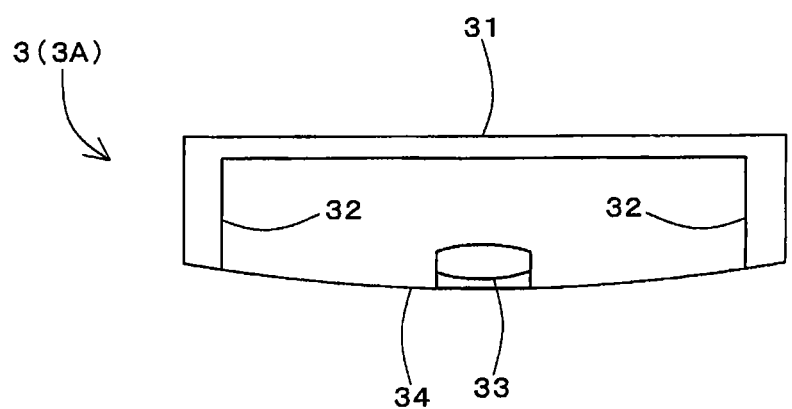
FIG. 7 is a side view of FIG. 5.

Meanwhile, the second member 3, as shown in FIGS. 5 to 7, comprises a substantially disk-shaped lid portion 31 which covers the opening 20, a connecting side-wall portion 32 suspended from the circumferential edge of the lid portion 31 and locking projections 33 extended inwards from the inner side surface of the connecting side-wall portion 32.

The connecting side-wall portion 32 overlies the connecting upright portion 21 of the first member 2 to support the locking projections 33. In this first embodiment, the connecting side-wall portion 32, as shown in FIGS. 1 and 5, is formed in a substantially cylindrical shape to entirely cover the outer side surface of the connecting upright portion 21. A shape of the connecting side-wall portion 32 is not limited to a cylindrical shape which entirely covers the above outer side surface, but may be modified accordingly e.g. by suspending a plurality of plate- or bar-like connecting side-wall portions 32 along the circumferential direction as in a third embodiment as described later.

The locking projections 33 connectably lock the second member 3, and are extended inwards from the inner side surface of the connecting side-wall portion 32. In this first embodiment, the locking projections 33, as shown in FIGS. 5 to 7, two locking projections 33,33 are projected inwards at symmetrical positions with respect to the central axis of the lid portion 31. In this first embodiment, the locking flanges 22,22 of the first member 2 and the locking projections 33,33 of the second member 3 are provided in a positional relationship to be reciprocally engageable.

In this first embodiment in the above constitution, as shown in FIGS. 2 and 5, the first member 2 and the second member 3 are formed so that a dimension from the central axis of the lid portion 31 in the second member 3 to an end of the locking projections 33 (R1) is over a radius of the connecting upright portion 21 in the first member 2 (R2) and is under a dimension from the central axis of the opening 20 to an end of the locking flanges 22 (R3). Consequently, when the lid portion 31 is covered on the opening 20, the locking projections 33 can be readily engaged with the locking flanges 22, and assuredly locked by rotation.

In this first embodiment, as shown in FIGS. 4 and 6, the first member 2 and the second member 3 are formed so that a dimension from an upper end surface of the connecting upright portion 21 to the lowermost position of the convex curved bottom faces 23 of the locking flanges 22 (H1) is substantially the same as a dimension from a ceiling plane of the lid portion 31 to the upper end surface of the locking projections 33 (H2). Thus, as described later, when the locking projections 33 are guided into the lowermost position of the convex curved bottom faces 23 of the locking flanges 22, a ceiling plane of the lid portion 31 closely contacts the opening 20 to seal a container body 2A. By placing a seal such as O-ring on the ceiling plane of said lid portion 31, airtightness may be improved. In this case, said dimension H1 may be determined accordingly in view of the extent of elastic deformation of the seal.

As shown in FIGS. 1 and 4, the first member 2 is provided with a plurality of concave curved joint surfaces 24 formed at a base-side circumferential part of the connecting upright portion 21 according to shape and position of a plurality of the convex curved bottom faces 23 of the locking flanges 22 to be correspond each other. Meanwhile, the second member 3 is provided with a plurality of convex curved joint surfaces 34 formed on bottom faces of the connecting side-wall portion 32 according to shape and position of said concave curved joint surfaces 24. Thus, when the first member 2 and the second member 3 are connected, outer side surfaces thereof are completely joined so that one outer side surface overlies the other.

Next, the operations of the connecting structure 1A in this first embodiment having the above constitution will be described with reference to FIG. 8. The following description provides a case example in which the lid body 3A as a second member 3 is connected to the container body 2A as a first member 2.

First, when the lid body 3A is connected to the opening 20 of the container body 2A using the connecting structure 1A of this first embodiment, as shown in FIG. 8(a), the locking projections 33 are positioned on a part at which the locking flanges 22 are not formed on the outer side surface of the connecting upright portion 21 or a part whose degree of extension is small on the border between the locking flanges 22 to cover the lid body 3A on the opening 20. In this case, each of the locking projections 33 doesn't come into contact with but fits the locking flanges 22, and the connecting side-wall portion 32 overlies the connecting upright portion 21 and the lid portion 31 is disposed on the uppers side of the opening 20.

Subsequently, when the lid body 3A is rotated, as shown in FIG. 8(b), each of the locking projections 33 is slowly guided downwards with sliding contact on the convex curved bottom faces 23 of each of the locking flanges 22. Consequently, the lid body 3A slowly descends to the opening 20. Then, even when the lid body 3A is rotated in either right or left direction, the symmetrically formed convex curved bottom faces 23 of each of the locking flanges 22 are operated in the same manner. In this first embodiment, since an end of each of the locking projections 33 is projected more inwards than an end of each of the locking flanges 22, the lid body 3A can be locked in the container body 2A.

Then, when the lid body 3A is rotated in the same direction up to at an angle of approximately 90° from the state in FIG. 8(a), each of the locking projections 33 is guided into the lowermost position of the convex curved bottom faces 23 as shown in FIG. 8(c). Consequently, the ceiling plane of the lid portion 31 comes into contact with an upper end surface of the connecting upright portion 21 to close the opening 20. Then, the bottom faces of the connecting side-wall portion 32 overlie the upper faces of the base-side circumferential part of the connecting upright portion 21, thereby readily viewing completion of connection and providing a new aesthetic quality of the connected members.

Meanwhile, when the lid body 3A is further rotated in the same direction from the above locking state, each of the locking projections 33 is released after coming off from the lowermost position of each of the locking flanges 22. As in cases where the members are locked, even when the lid body 3A is rotated in the opposite direction, it is released. Thus, users can readily open and close the lid body 3A without paying attention to a specific direction of rotation.

In this first embodiment, as a constitution for guiding the locking projections 33, locking flanges 22 are employed instead of a conventional type of groove. Thus, since the container body 2A is not provided with a part which contacts with a lower end of the locking projections 33, frictional resistance at opening/closing can be reduced compared to a conventional type of groove. With no use of a groove, a connecting structure 1A of this invention can generate little rubbish such as sand and dust, and if any, can readily remove such substances. Even when the lid body 3A is rotated with rubbish attached thereon, smooth sliding can be guaranteed, because the locking projections 33 can readily scrape out and discharge rubbish.

The aforementioned this first embodiment can provide the following advantages:
1. Even when a second member 3 is rotated in either direction, it can be attached to or detached from a first member 2 by slight rotation;
2. Due to little impact of sand and rubbish, etc., the connecting structure 1A can be used even at a place where sand and rubbish are readily attached to the connecting upright portion 21, such as seaside;
3. Frictional resistance for attaching or detaching the first member 2 can be reduced and the first member 2 can be readily opened and closed even by children, the elderly and manually disabled persons by small force; and
4. Whether the first member 2 is connected to the second member 3 or not and the extent of connection can be visually confirmed in an easy manner.

Next, a second embodiment of a connecting structure 1B according to the present invention will be described. Descriptions in a constitution of this second embodiment, which are the same as or equivalent to the constitution of the aforementioned first embodiment, will be given with the identical symbols, and redundant descriptions corresponding to the first embodiment will not be provided.

Figure 9:
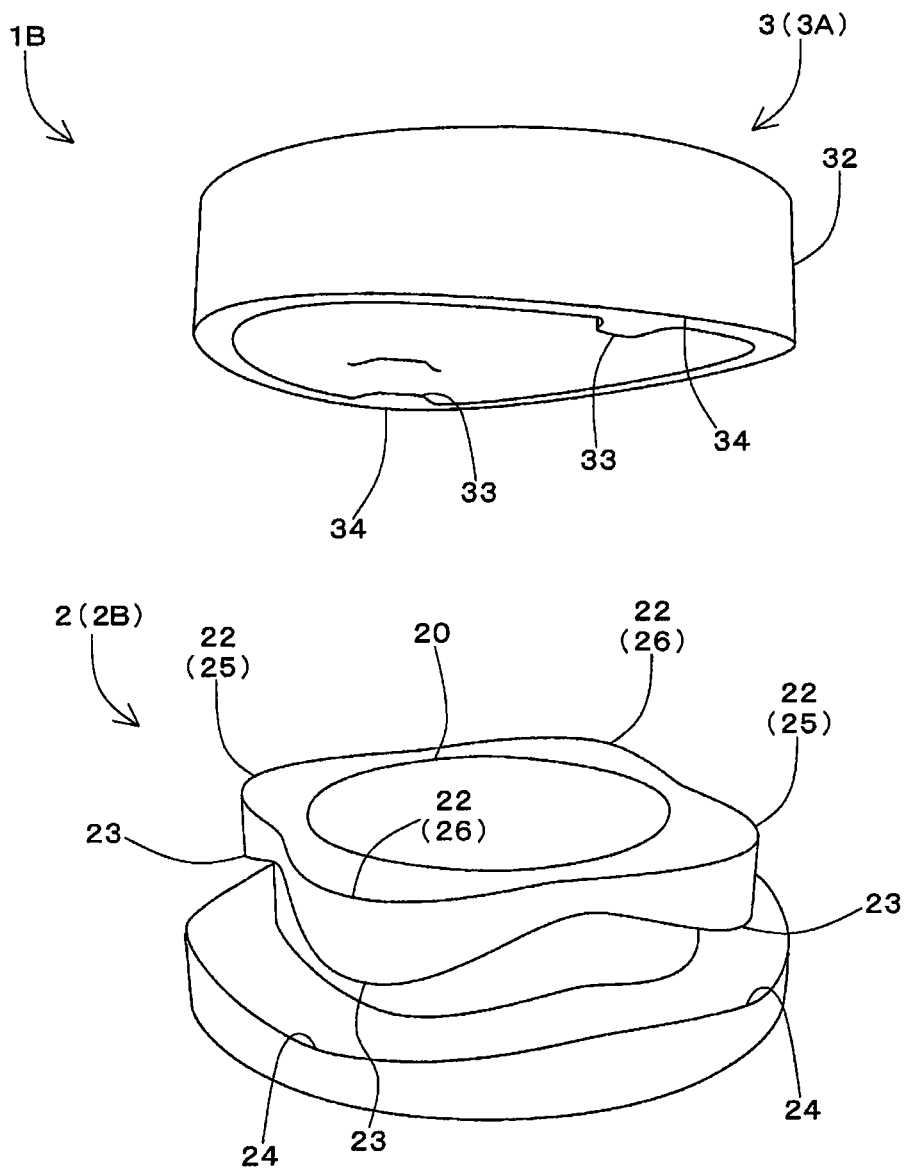
FIG. 9 is a perspective view showing a second embodiment of a connecting structure according to the present invention.
Figure 10:
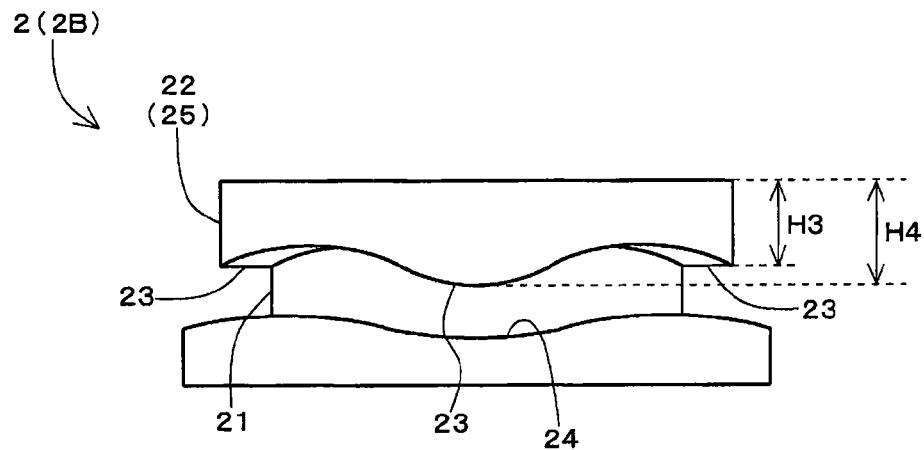
FIG. 10 is an elevational view showing a first member in this second embodiment.
Figure 11:
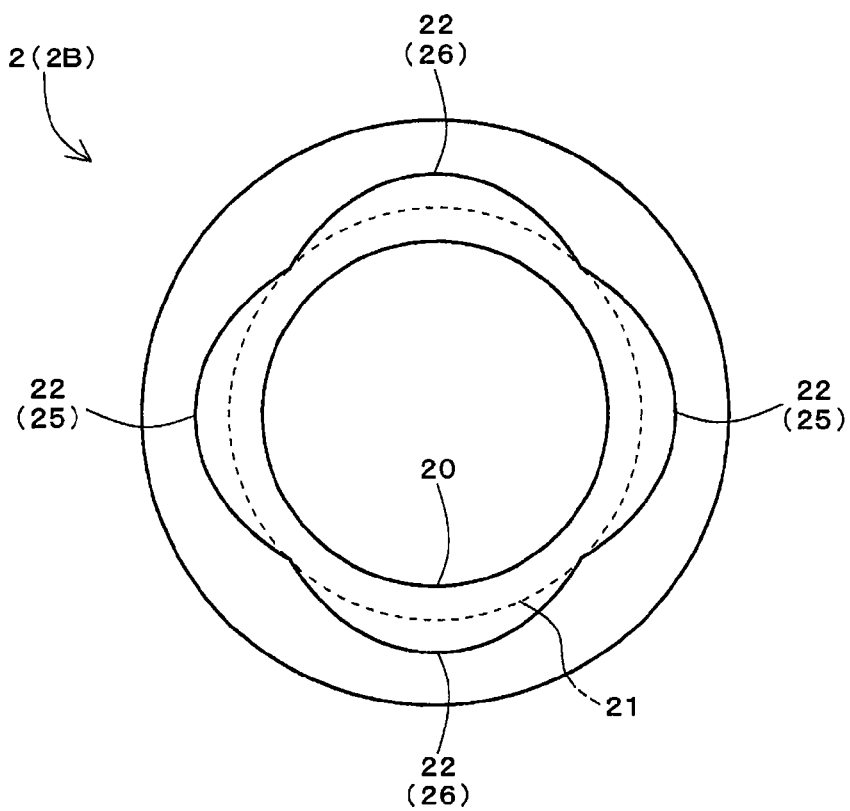
FIG. 11 is a plan view of FIG. 10.

This second embodiment is characterized in that as shown in FIGS. 9 to 11, two ore more groups of locking flanges whose dimension from an upper end surface of the connecting upright portion 21 to the lowermost position of the convex curved bottom faces 23 varies are provided in a container body 2B as a first member 2. In this manner, the locking height can be changed and the extent of locking can be adjusted.

Specifically, each group of locking flanges comprises a plurality of locking flanges 22 whose said dimension is identical. In this second embodiment, as shown in FIG. 10, each group of locking flanges comprises groups of weakly locking flanges 25 whose extent of locking is small composed of a pair of locking flanges 22 whose said dimension H3 is short and groups of strongly locking flanges 26 whose extent of locking is large composed of a pair of locking flanges 22 whose said dimension H4 is long. The locking flanges 22 comprising each group of locking flanges, as shown in FIG. 11, are provided at symmetrical positions with respect to the central axis of the opening 20 rotated at an angle of approximately 90° from each of locking flanges 22 comprising other groups of locking flanges.

Next, the operations of the connecting structure 1B in this second embodiment having the aforementioned constitution will be described with reference to FIG. 12. A case example in which the lid body 3A as a second member 3 is connected to the container body 2B as a first member 2 will be described.

First, when the lid body 3A is connected to the opening 20 of the container body 2B using the connecting structure 1B of this second embodiment, as shown in FIG. 12 (*a*), the locking projections 33 are positioned on a part at which the locking flanges 22 are not formed on the outer side surface of the connecting upright portion 21 or a part whose degree of extension is small on the border between the locking flanges 22 to cover the lid body 3A on the opening 20.

Subsequently, when the lid body 3A is rotated at an angle of approximately 45° in a prescribed direction, as shown in FIG. 12 (*b*), each of the locking projections 33 slides and contacts on the convex curved bottom faces 23 of groups of weakly locking flanges 25 to be guided into the lowermost position of the groups of flanges 25. Consequently, the lid body 3A slowly descends to the opening 20 and each of the locking projections 33 is locked at shallow position with respect to the groups of weakly locking flanges 25. Thus, the lid body 3A is loosely connected to the container body 2B as in temporary joint.

Meanwhile, when the lid body 3A is rotated at an angle of 45° in the opposite direction from the state in FIG. 12(*a*), as shown in FIG. 12 (*c*), each of the locking projections 33 slides and contacts on the convex curved bottom faces 23 of groups of strongly locking flanges 26 to be guided into the lowermost position of the groups of flanges 26. Consequently, the lid body 3A slowly descends to the opening 20 and each of the locking projections 33 is locked at the deepest position with respect to the groups of strongly locking flanges 26. Thus, the lid body 3A is firmly connected to the container body 2B. The state in FIG. 12 (*c*) in which the lid body 3A is locked at the deepest position may be obtained by rotating the lid body 3A shown in said FIG. 12 (*b*) at an angle of approximately 45° in the same direction.

According to a connecting structure 1B of the aforementioned this second embodiment, rotation required for connection can be reduced and the extent of connection between the first member 2 and the second member 3 can be adjusted accordingly, in addition to the operational effects of the above-described first embodiment.

A constitution of the groups of locking flanges is not limited to the above constitution, but may be modified accordingly. For example, three groups of locking flanges whose dimension from an upper end surface of the connecting upright portion 21 to the lowermost position of the convex curved bottom faces 23 varies may be provided and rotated to be each disposed at an angle of approximately 60° in the circumferential direction. Consequently, a locking force between the first member 2 and the second member 3 can be adjusted and classified into 3 levels (high, middle and low).

Next, a third embodiment of a connecting structure 1C according to the present invention will be described. Descriptions in a constitution of this third embodiment, which are the same as or equivalent to the constitution of the aforementioned first embodiment, will be given with the identical symbols, and redundant descriptions corresponding to the first embodiment will not be provided.

Figure 13:
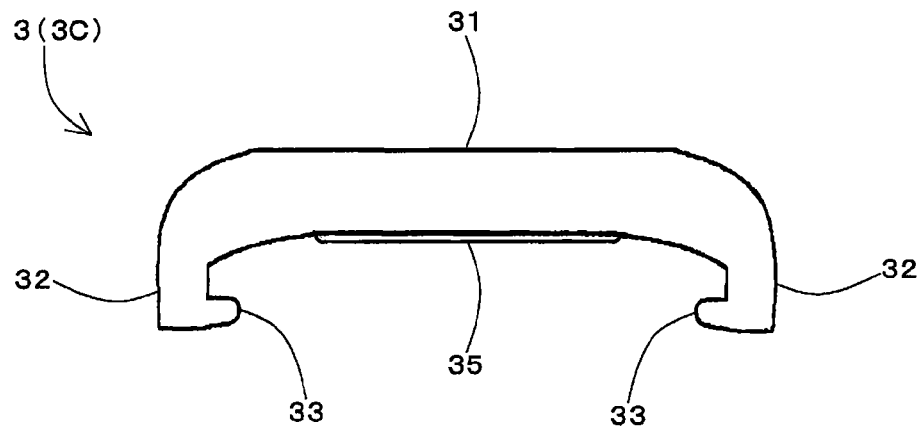
FIG. 13 is an elevational view showing a second member in this third embodiment.
Figure 14:
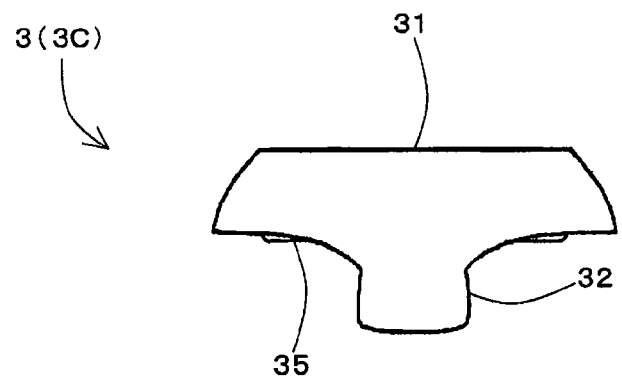
FIG. 14 is a side view of FIG. 13.
Figure 15:
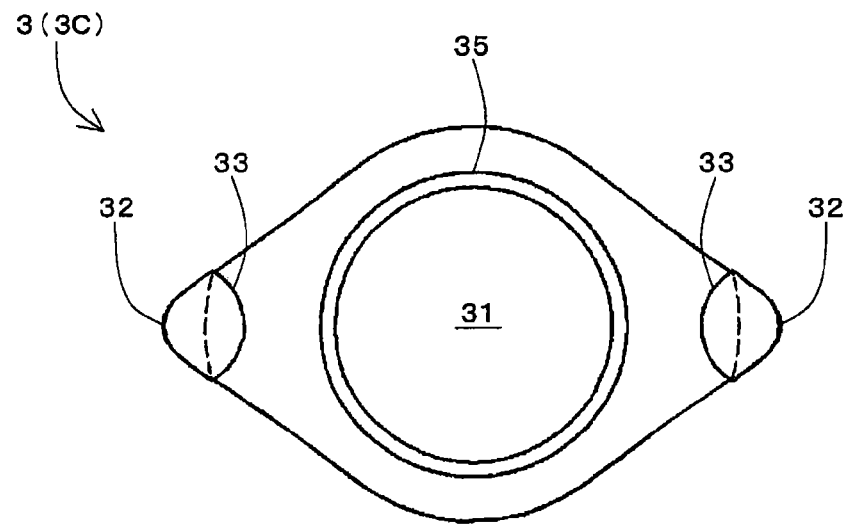
FIG. 15 is a bottom view of FIG. 13.

This third embodiment is characterized in that as shown in FIGS. 13 to 15, the connecting side-wall portion 32 is composed of a pair of plate- or bar-like connecting side-wall portions 32,32, and the bottom faces of the lid portion 31 are provided with a sealing member 35 in the lid body 3C as a second member 3.

In this third embodiment, a pair of connecting side-wall portions 32,32 are symmetrically suspended with respect to the central axis of the lid portion 31. Then, the locking projections 33 are projected inwards from a lower end of each of the connecting side-wall portions 32. The connecting side-wall portion 32 is not limited thereto in number and shape, and may be provided in plural number at identical angles in the circumferential direction. The sealing member 35 is to improve airtightness and watertightness with the opening 20 and is composed of an O-ring, etc. whose diameter is larger than that of the opening 20.

Next, the operations of a connecting structure 1C in this third embodiment having the above constitution will be described with reference to FIG. 16. In the following descriptions, a case example in which the lid body 3C as a second member 3 is connected to the container body 2A as a first member 2, will be described.

Figure 16:
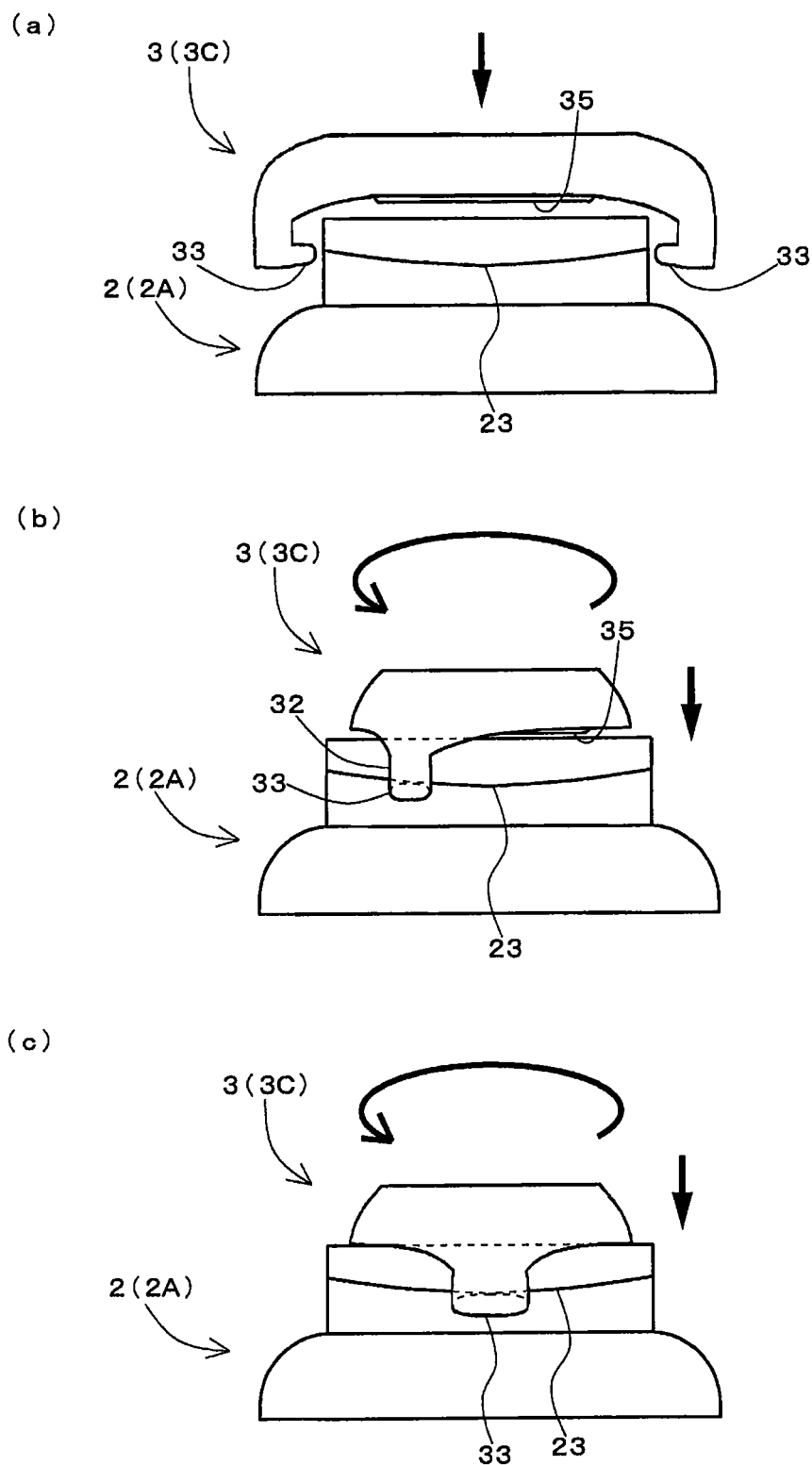
FIG. 16 is an explanatory drawing in cases where a second member is connected to a first member in this third embodiment.

First, when the lid body 3C is connected to the opening 20 of the container body 2A using the connecting structure 1C of this third embodiment, as shown in FIG. 16(*a*), the locking projections 33 are positioned on a part at which the locking flanges 22 are not formed on the outer side surface of the connecting upright portion 21 or a part whose degree of extension is small on the border between the locking flanges 22 to cover the lid body 3C on the opening 20.

Subsequently, when the lid body 3C is rotated, as shown in FIG. 16(*b*), each of the locking projections 33 slides and contacts on the convex curved bottom faces 23 of each of the locking flanges 22 to be guided downwards, and when the lid body 3C is rotated at an angle of approximately 90° from the state in FIG. 16 (*a*), as shown in FIG. 16 (*c*), each of the locking projections 33 is guided into the lowermost position of the convex curved bottom faces 23. Consequently, the lid body 3C slowly descends to the opening 20, and each of the locking projections 33 is locked in the locking flanges 22 to connect the lid body 3C to the container body 2A.

Then, in this third embodiment, since each of the connecting side-wall portions 32 doesn't completely cover the outer side surface of the connecting upright portion 21, the outer side surface is constantly exposed. Thus, only by visually confirming a positional relationship between the connecting side-wall portion 32 and the locking flanges 22, completion of connection can be readily determined. In this third embodiment, the sealing member 35 provided on the bottom faces of the lid portion 31 is pressure contacted on the circumference of the opening 20, resulting in improvement in airtightness and watertightness of the container body 2A.

According to a connecting structure 1C of the aforementioned this third embodiment, a connecting state between the first member 2 and the second member 3 can be visually confirmed in an easy manner, and airtightness and watertightness of the container body 2A can be improved, in addition to the operational effects of the aforementioned first embodiment.

EXAMPLE 1

Next, a specific Example 1 of a connecting structure according to the present invention will be described. In this Example 1, a connecting structure according to the present invention is applied as a structure for connecting a prescribed gas injecting tool to a gaseous structure 2D as a first member 2 having a flat valve device 4 (U.S. Pat. No. 3,504,945) invented by this inventor via an adapter 3D as a second member 3.

Figure 17:
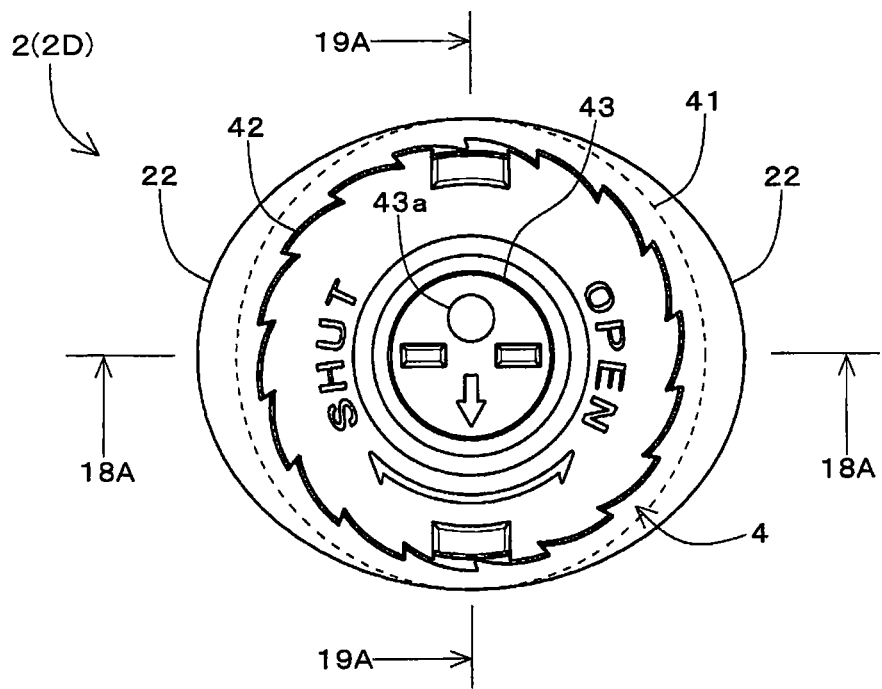
FIG. 17 is a plan view showing a flat valve device of this Example 1.
Figure 18:
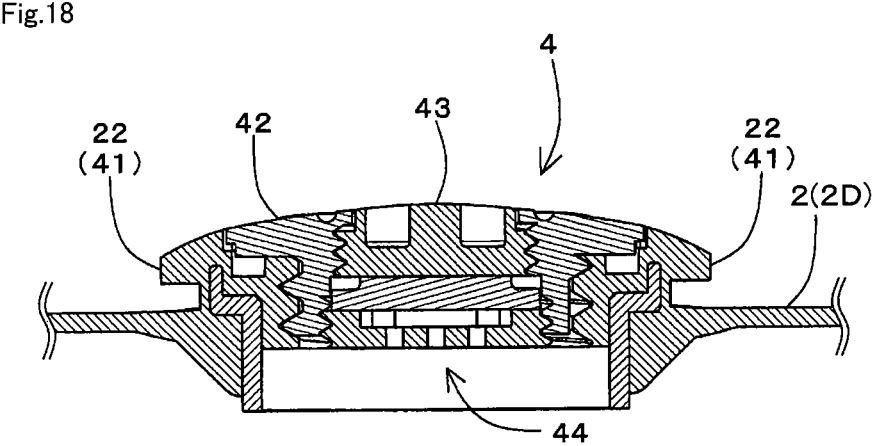
FIG. 18 is a sectional view taken along the line 18A-18A of FIG. 17.
Figure 19:
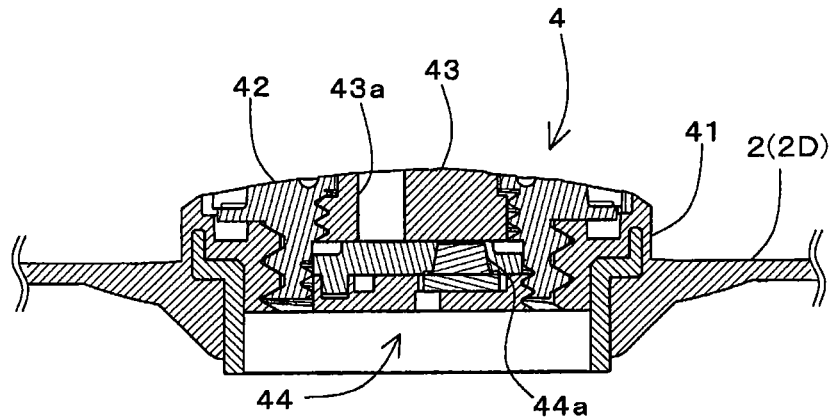
FIG. 19 is a sectional view taken along the line 19A-19A of FIG. 17.

First, a constitution of a flat valve device 4 of this Example 1 will be described. The flat valve device 4, as shown in FIGS. 17 to 19, mainly comprises an external frame member 41 composed of a connecting upright portion 21 of the gaseous structure 2D, a body member 42 which is detachably mounted on the opening 20 of the external frame member 41, a rotary lid 43 which is rotatably mounted on the body member 42 and a valve mechanism 44 provided inside the body member 42.

In this Example 1, two locking flanges 22 are projected at symmetrical positions with respect to the central axis on the outer side surface of the external frame member 41. The body member 42, as shown in FIGS. 18 and 19, accommodates a valve mechanism 44 below the rotary lid 43, and a gas injecting hole 43a which can communicate with the valve mechanism 44 is formed in the rotary lid 43. Then, a hermetic lid 44a is elastically retained in the valve mechanism 44 and by barometrically pressing down the hermetic lid 44a, the gaseous structure 2D is communicated between inside and outside. Thus, by rotating said rotary lid 43 to adjust the position of the gas injecting hole 43a, gas can be injected and the valve mechanism 44 can be closed.

Figure 20:
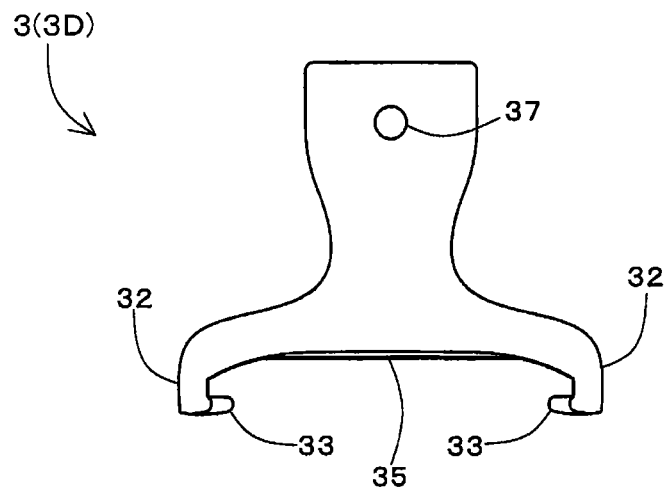
FIG. 20 is an elevational view showing an adapter of this Example 1.
Figure 21:
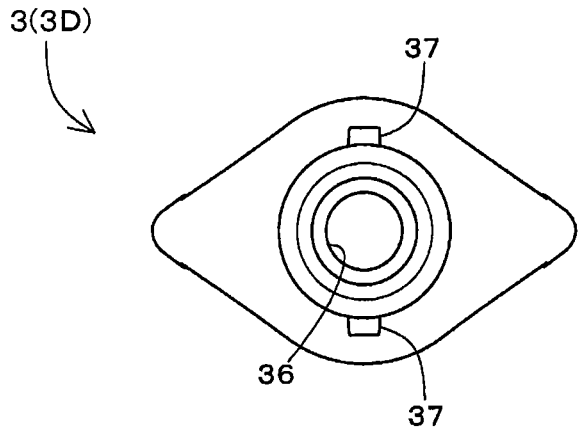
FIG. 21 is a plan view showing an adapter of this Example 1.
Figure 22:
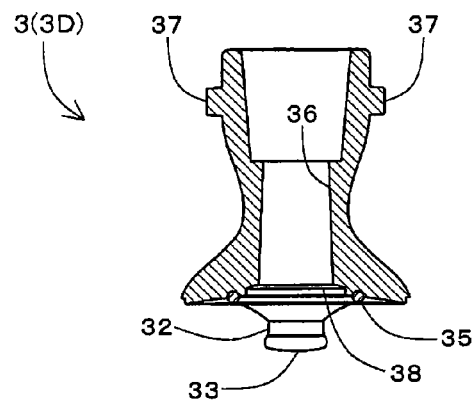
FIG. 22 is a sectional view taken along the line 22A-22A of FIG. 20.

Meanwhile, the adapter 3D of this Example 1, as shown in FIGS. 20 to 22, is provided with a lid-side gas injecting hole 36 formed on a lid body 3C corresponding to the aforementioned this third embodiment. The lid-side gas injecting hole 36 runs through from an upper end surface of the adapter 3D to a bottom face thereof. A prescribed air injecting tool (not shown) is connected to an upper end of the adapter 3D via a connecting projection 37. Meanwhile, a circular concave portion 38 is formed on the bottom face of the adapter 3D to allow the lid-side gas injecting hole 36 to communicate with the gas injecting hole 43a of the rotary lid 43.

A method for connecting the flat valve device 4 and the adapter 3D of this Example 1 having the above constitution and injecting gas into the gaseous structure 2D will be described.

First, the rotary lid 43 screwed onto the body member 42 in the flat valve device 4 is rotated at a prescribed angle to dispose the gas injecting hole 43a opposite to the hermetic lid 44a of the valve mechanism 44. Consequently, the valve mechanism 44 allows the gas injecting hole 43a and the inside of the gaseous structure 2D to communicate therebetween by bearing air pressure which presses down the hermetic lid 44a, and gas can be injected therein.

Figure 23:
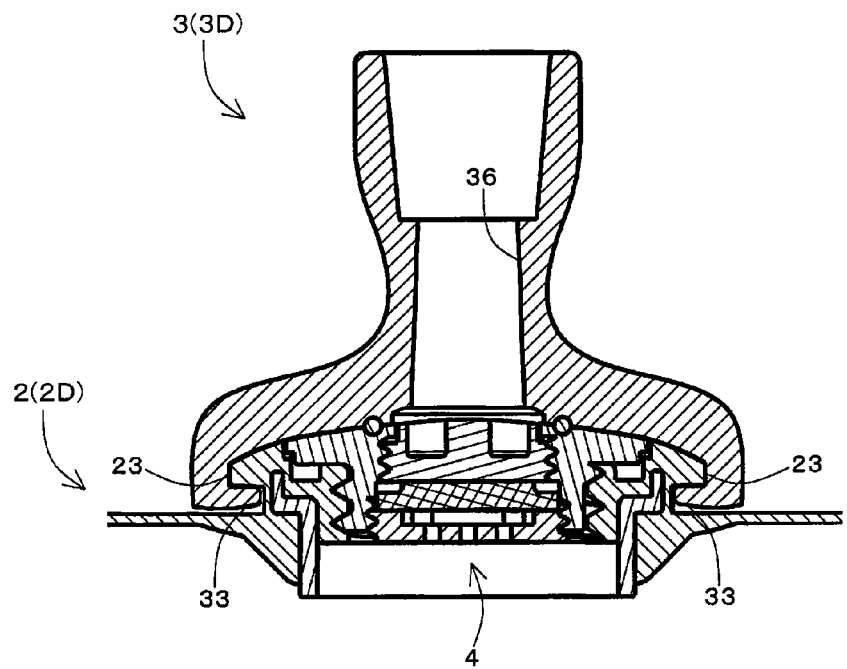
FIG. 23 is a sectional view showing a state in which an adapter is connected to a gaseous structure in this Example 1.
Figure 24:
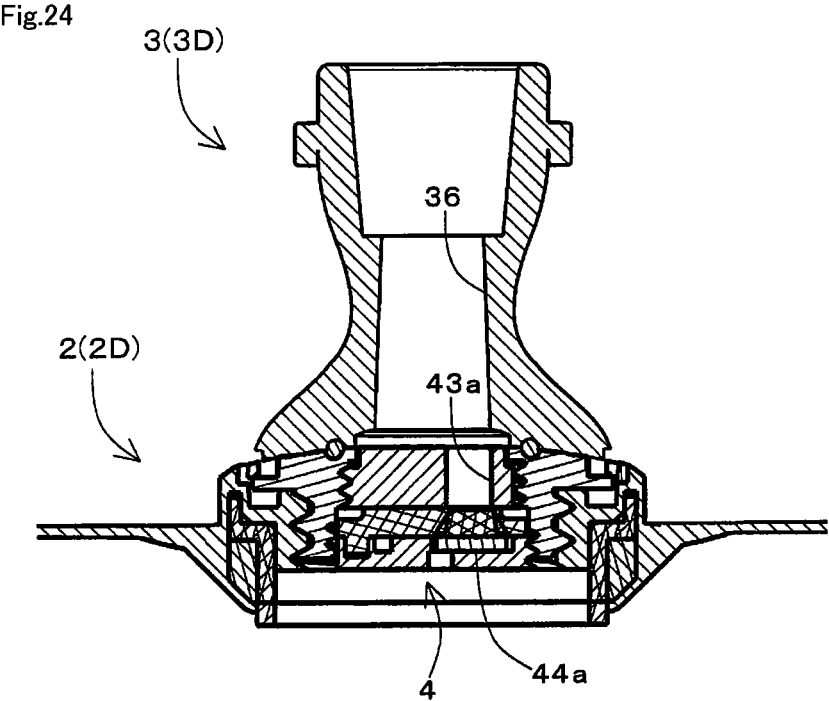
FIG. 24 is a sectional view in orthogonal direction of FIG. 23.

Subsequently, the adapter 3D is covered on the external frame member 41 to be rotated, thereby allowing each of the locking projections 33 of the adapter 3D to slide along the convex curved bottom faces 23 of each of the locking flanges 22. Consequently, as shown in FIGS. 23 and 24, the ceiling plane of the adapter 3D comes into contact with the upper end surface of the body member 42, while the sealing member 35 is fitted into the circular concave portion 38 to be sealed and the lid-side gas injecting hole 36 and the gas injecting hole 43a of the rotary lid 43 are communicated therebetween.

In this state, gas is fed from the gas injecting tool connected to the upper end of the lid-side gas injecting hole 36. Consequently, gas injected into the circular concave portion 38 via the lid-side gas injecting hole 36 is fed to the valve mechanism 44 via the gas injecting hole 43a. Consequently, gas is injected into the gaseous structure 2D after the hermetic lid 44a of the valve mechanism 44 is barometrically pressed down.

When the gaseous structure 2D is filed with gas, gas feeding by the gas injecting tool is stopped. Thereafter, only by rotating the adapter 3D at an angle of approximately 90° in either direction, connection between the adapter 3D and the external frame member 41 is disabled. After removing the adapter 3D, the rotary lid 43 is rotated to be moved to a position where the gas injecting hole 43a cannot communicate with the valve mechanism 44.

The aforementioned this Example 1 can provide the following advantages:

1. A connecting structure can function as an adapter 3D when an air injecting tool is connected to a gaseous structure 2D having a flat valve device 4;
2. An adapter 3D can be swiftly attached to or detached from locking flanges 22 of an external frame member 41; and
3. A connecting structure can be readily connected with high airtightness.

EXAMPLE 2

Next, a specific Example 2 of a connecting structure according to the present invention will be described. In this Example 2, a plastic bottle 2E is employed as a first member 2, and a connecting structure according to the present invention is applied as a structure for connecting a cap 3E as a second member 3 to an opening 20 of the plastic bottle 2E.

Figure 25:
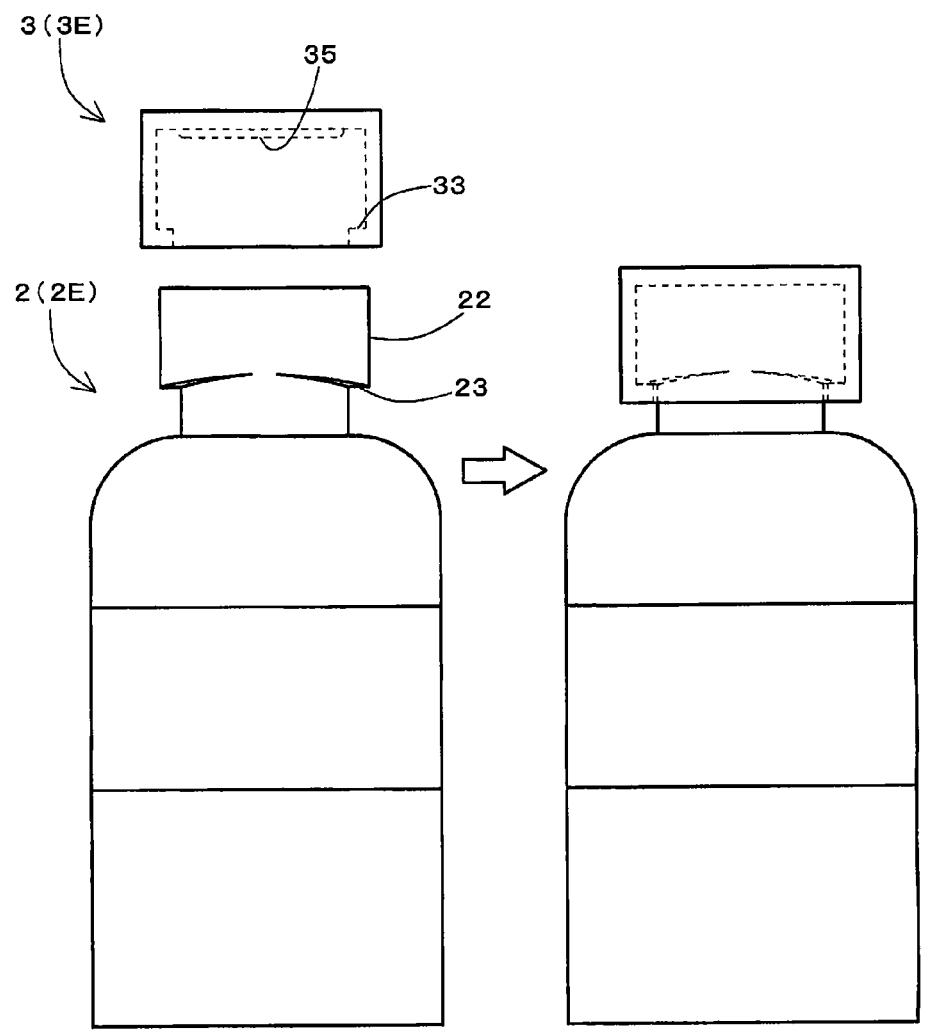
FIG. 25 is a diagram showing Example 2 in which a connecting structure according to the present invention is applied to connection between a plastic bottle and a cap.

Specifically, as shown in FIG. 25, a drinking portion of the plastic bottle 2E of this Example 2 is provided substantially similarly to the container body 2A corresponding to the aforementioned first embodiment. Meanwhile, the cap 3E is provided substantially similarly to the lid body 3A corresponding to the aforementioned first embodiment and provided with a sealing member 35 for improving watertightness.

The aforementioned this Example 2 can readily and swiftly attach the cap 3E to or detach the same from a plastic bottle 2E without reducing watertightness.

EXAMPLE 3

Next, a specific Example 3 of a connecting structure according to the present invention will be described. In this Example 3, a connecting structure according to the present invention is applied as a structure for connecting plastic bottles.

Figure 26:
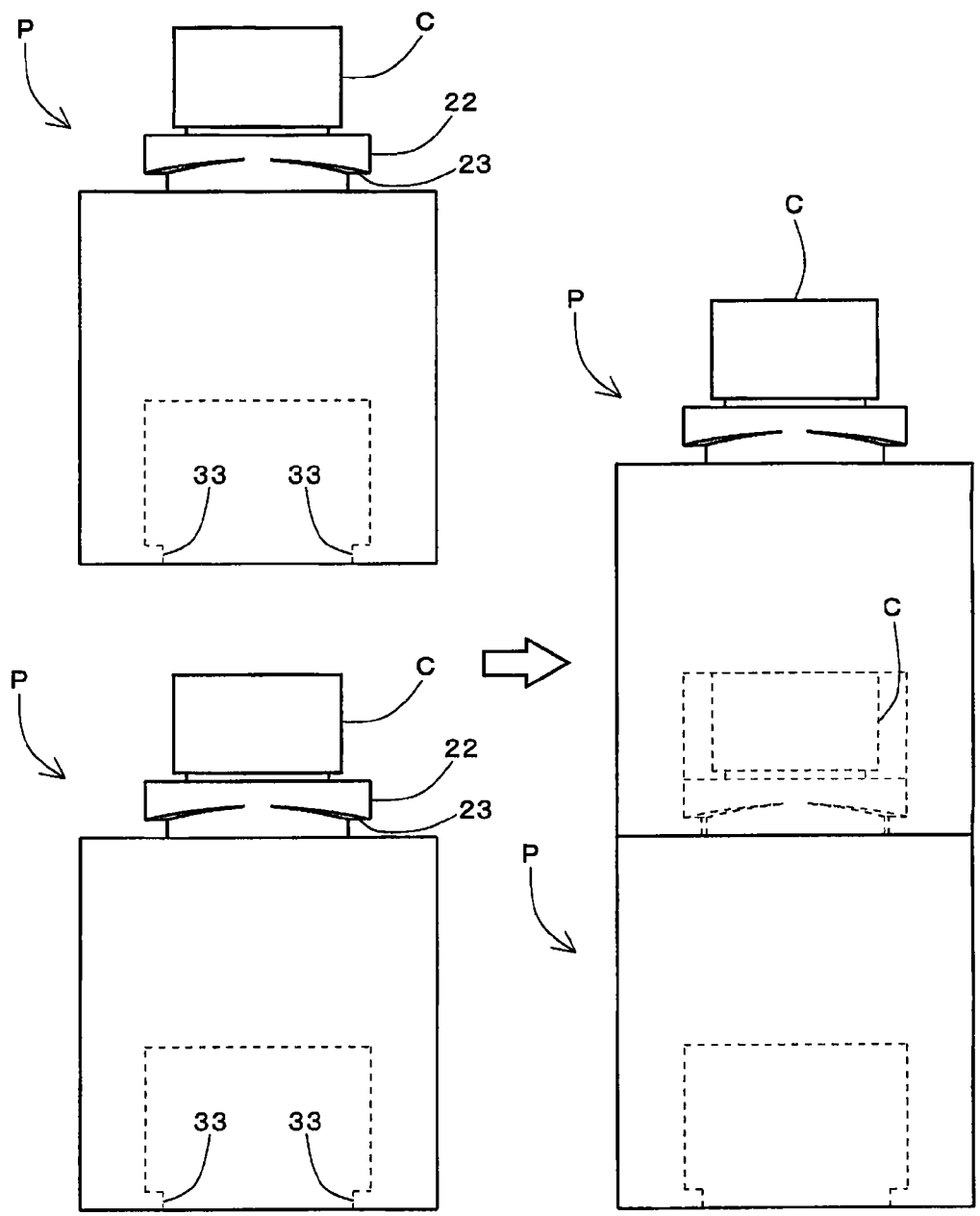
FIG. 26 is a diagram showing Example 3 in which a connecting structure according to the present invention is applied to connection between plastic bottles.

Specifically, as shown in FIG. 26, a plastic bottle P of this Example 3 is provided with each of constituted portions of a first member 2 formed at a lower position of a normal cap C, and each of constituted portions of a second member 3 is formed on a bottom face of the plastic bottle P. In this Example 3, each of the constituted portions as a first member 2 is provided substantially similarly to the aforementioned first embodiment. Meanwhile, each of the constituted portions as a second member 3 is formed so that a dimension from a ceiling plane of the lid portion 31 to an upper end surface of the locking projections 33 (H2) is enough to accommodate the cap C.

The aforementioned this Example 3, as shown in FIG. 26, can save space and readily transport plastic bottles, because a plurality of plastic bottles P can be linked as requested. For example, a plastic bottle P containing coffee and a plastic bottle P containing tee are linked to be provided as one set, which can create a new market demand. Each of the constituted portions as a first member 2 may be provided not only at a lower position of the cap C, but also on a shoulder of the plastic bottle P.

EXAMPLE 4

Next, a specific Example 4 of a connecting structure according to the present invention will be described. In this Example 4, a connecting structure according to the present invention is applied as a locking structure for bags used by locking a covering lid such as second bag.

Specifically, as shown in FIG. 27, a connecting structure comprises a bag body 2F as a first member 2 and a covering lid 3F as a second member 3. In this Example 4, a connecting portion of a bag body 2F is provided substantially similarly to the aforementioned first embodiment, without an opening 20. Meanwhile, the connecting portion of the covering lid 3F is provided substantially similarly to the aforementioned first embodiment, rotatably provided on a covering lid 3F, and an outer circumferential surface thereof is formed with concave and convex to improve operability and aesthetic sense.

The aforementioned this Example 4 can provide a connecting structure having favorable design function to lock the covering lid 3F in the bag body 2F.

EXAMPLE 5

Next, a specific Example 5 of a connecting structure according to the present invention will be described. In this Example 5, a connecting structure according to the present invention is applied as a structure for connecting detachable accessories such as cuff link and pierced earrings.

Figure 28:
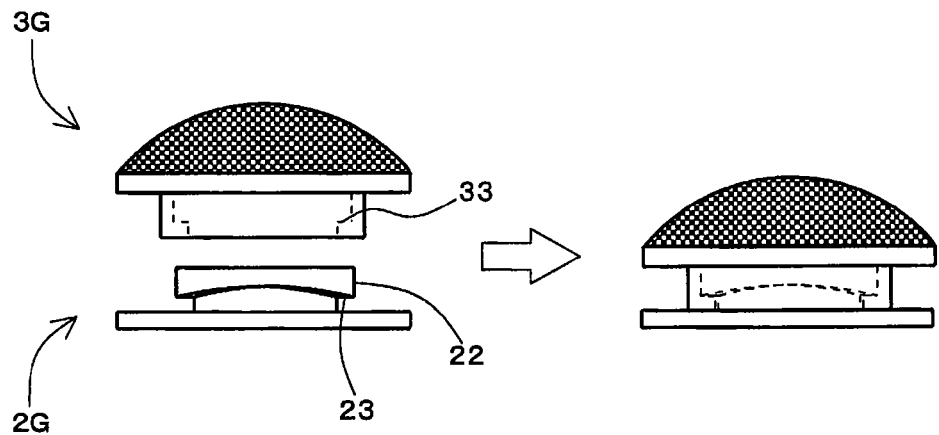
FIG. 28 is a diagram showing Example 5 in which a connecting structure according to the present invention is applied to cuff links.

Specifically, as shown in FIG. 28, a connecting structure comprises a base portion 2G as a first member 2 and an ornament portion 3G as a second member 3. In this Example 5, the base portion 2G is provided substantially similarly to the aforementioned first embodiment and functions like a "back" button of a school-boy uniform in which a base end portion thereof is widened. The ornament portion 3G is provided substantially similarly to the aforementioned first embodiment and desired ornaments and patterns are formed on upper faces thereof.

The aforementioned this Example 5 can provide accessories such as cuff link and pierced earrings which can be readily and swiftly attached and detached, or rings whose ornament portion can be replaced.

EXAMPLE 6

Next, a specific Example 6 of a connecting structure according to the present invention will be described. In this Example 6, a connecting structure according to the present invention is applied as a connecting structure for connecting cords used in electrical appliances such as personal computers.

Figure 29:
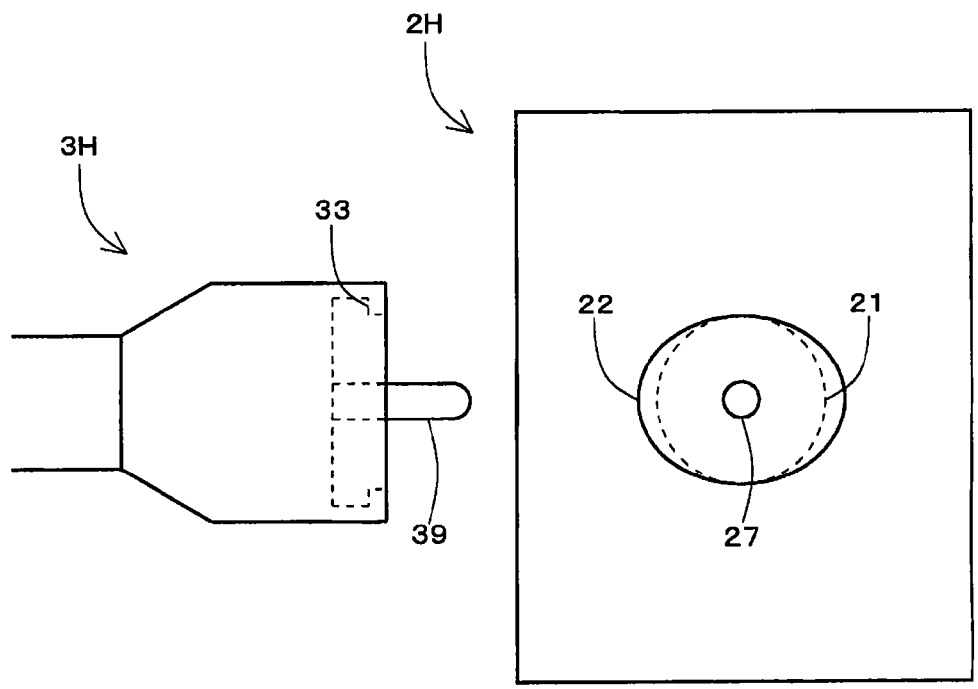
FIG. 29 is a diagram showing Example 6 in which a connecting structure according to the present invention is applied to electrical appliances.

Specifically, as shown in FIG. 29, an electrical appliance 2H as a first member 2 is provided substantially similarly to the aforementioned first embodiment, and an insertion hole 27 is formed at the center of a connecting upright portion 20. A connecting plug 3H as a second member 3 is provided with a metal fitting for electric conduction 39 which is connected in the state of energization by being inserted into the insertion hole 27.

The aforementioned this Example 6 can provide a connecting portion for electrical appliances, etc. and prevent the connecting portion from readily coming off only by tensile force.

EXAMPLE 7

Next, a specific Example 7 of a connecting structure according to the present invention will be described. In this Example 7, a connecting structure according to the present invention is applied as a button used in garments such as shirts and jackets.

Figure 30:
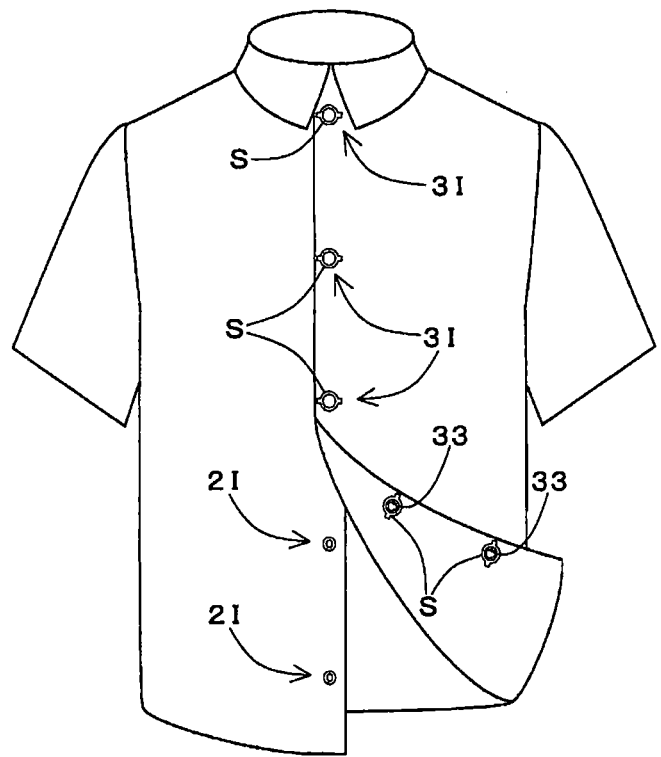
FIG. 30 is a diagram showing Example 7 in which a connecting structure according to the present invention is applied to buttons.

Specifically, as shown in FIG. 30, a button base 2I as a first member 2 is mounted at prescribed intervals inside of a front open part of a garment. A rotary button 3I as a second member 3 corresponding to each of said button bases 2I is mounted outside of a front open part. In this Example 7, the button base 2I is provided almost similarly to the container body 2A of the aforementioned first embodiment and the rotary button 3I is provided almost similarly to the lid body 3A of the aforementioned first embodiment, with the identical basic structure for connection. Each of the rotary buttons 3I is rotatably supported by a rotatably supporting member S incorporated in the front open part.

When a button is fastened with a connecting structure of this Example 7, the rotary button 3I is fit into the button base 2I to pivotally rotate the supporting member S, and locking projections 33 are engaged with locking flanges 22 to be fastened. Consequently, since this method is easier and requires a smaller force than a case where a button is fastened to a button hole, even children and manually disabled persons can readily fasten a button. In addition, since said rotary button 3I is not required to pass through a button hole, the rotary button 3I is not limited in design, and may be formed of conventional round, quadrangle and many other designs.

Figure 31:
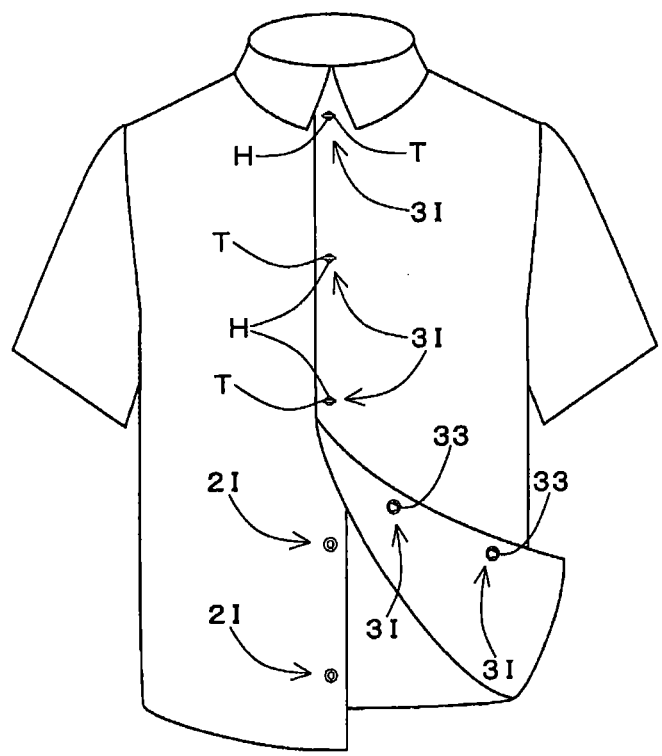
FIG. 31 is a diagram showing another example of Example 7 in which a connecting structure according to the present invention is applied to buttons.

As another example of this Example 7, as shown in FIG. 31, using a button hole H of a conventional front open part, the button hole H may be rotatably provided with a rotary button 3I. Specifically, a rotary knob T in view of a size of the button hole H is provided on a surface of the rotary button 3I and provided so that said rotary knob T doesn't fall from the button hole H. When said rotary button 3I passes through the button hole H and overlies an inner button base 2I to rotate said rotary knob T, the locking projections 33 of the rotary button 3I are engaged with the locking flanges 22 of the button base 2I to be connected.

The aforementioned this Example 7 can be applied to garment buttons which can be readily attached and detached even by children and manually disabled persons. In this Example 7, the locking flanges 22 are provided on the button base 2I and the locking projections 33 are provided on the rotary button 3I, but the constitution may be reversely provided as long as it is feasible in structure. This is applied to other examples.

A connecting structure according to the present invention is not limited to each of the aforementioned embodiments, but may be modified accordingly.

For example, each of the aforementioned embodiments is not provided with a mechanism for retaining a state of connection, but it is not limited thereto, and a state of connection may be maintained, using a lock ball mechanism.

Figure 32:
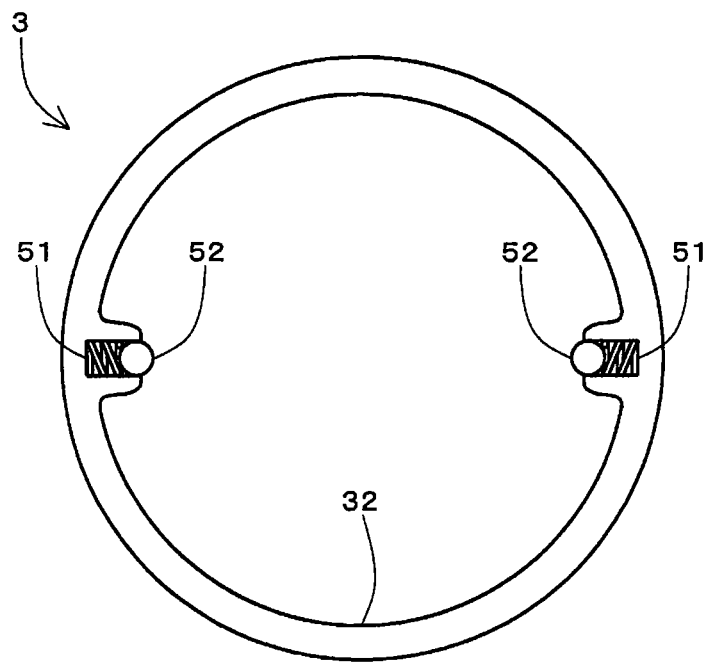
FIG. 32 is a bottom view showing a second member using lock ball mechanism.
Figure 33:
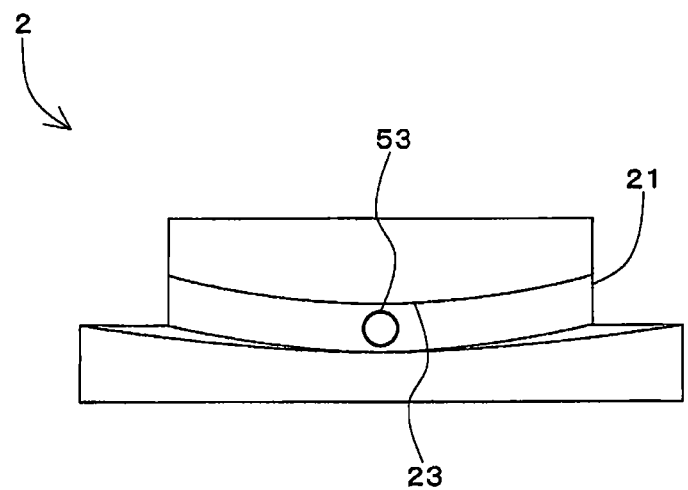
FIG. 33 is a side view showing a first member using lock ball mechanism.

Specifically, as shown in FIG. 32, a biasing member 51 such as coil spring is incorporated into each of locking projections 33, and a lock ball 52 is retained on an end side of the biasing member 51. Consequently, the lock ball 52 is biased so that it is projected from an end surface of the locking projections 33. Meanwhile, as shown in FIG. 33, a connecting upright portion 21 of a first member 2 is provided with a lock hole 53 for fitting the lock ball 52 formed on an outer side surface corresponding to the lowermost position of locking flanges 22.

Figure 34:
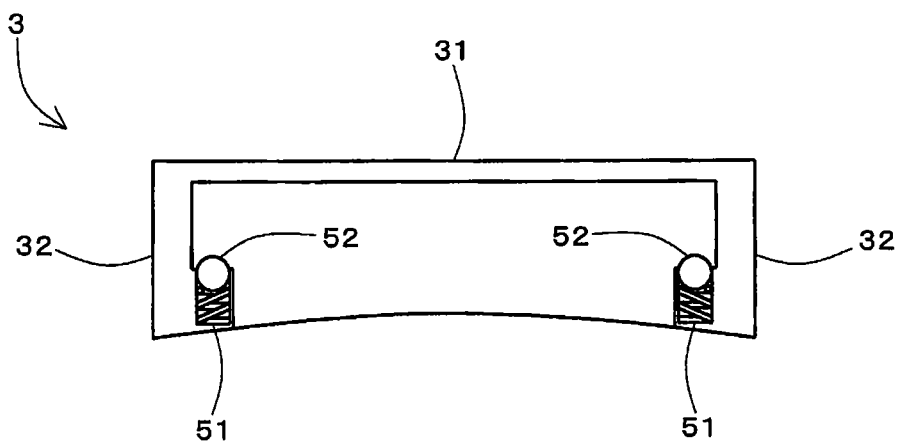
FIG. 34 is a sectional view showing a second member using other lock ball mechanism.
Figure 35:
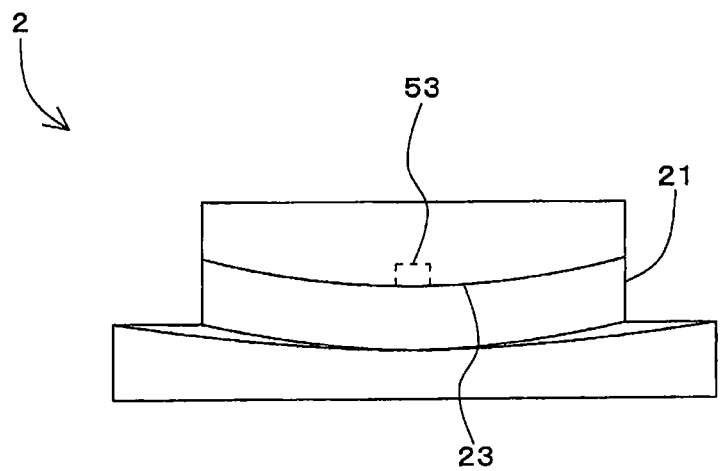
FIG. 35 is a side view showing a first member using other lock ball mechanism.

Meanwhile, as shown in FIG. 34, the lock ball 52 is retained by the biasing member 51 so that it is projected from upper faces of each of the locking projections 33. On the other hand, as shown in FIG. 35, the connecting upright portion 21 is provided with the lock hole 53 for fitting the lock ball 52 formed on the convex curved bottom faces 23 corresponding to the lowermost position of the locking flanges 22. The lock ball 52 is retained to smoothly slide and rotate by a known technique.

According to the above constitution, when the locking projections 33 are guided into the lowermost position of the convex curved bottom faces 23 of the locking flanges 22, the lock ball 52 is fitted into the lock hole 53. Thus, users can readily recognize completion of connection between the first member 2 and the second member 3 from click feeling generated when the lock ball 52 is fitted into the lock hole 53. Even when unexpected force is applied to the first member 2 and the second member 3 which are connected, release of a state of connection can be prevented. By rotating and sliding the lock ball 52 along the outer side surface of the connecting upright portion 21 or the convex curved bottom faces 23, the first member 2 can be smoothly rotated by small force.

Each of the above embodiments describes a container body and a lid body as an example regarding a first member 2 and a second member 3, but it is not limited to this constitution, and as long as two members are connected in use, size and strength can be accordingly changed for connecting structures in various goods. For example, other than each of the aforementioned examples, the connecting structure according to the present invention can be applied to a connecting structure between a filler cap of an automobile, etc., and fuel supply hose, a connecting structure for tow equipment for towing an automobile, etc., a connecting structure for block toys, a connecting structure for piping, a connecting structure for belt buckles, a locking structure for signs and a connecting structure with a handle portion used by replacing a screw driver whose diameter varies, etc.

The invention claimed is:

1. A connecting structure which connects a first member and a second member, wherein:
    a first member comprises a connecting upright portion which is projected in a substantially cylindrical shape and comprises two or more groups of locking flanges whose locking forces vary, composed of a plurality of locking flanges provided to extend outwards along a circumferential direction of an outer side surface of the connecting upright portion; and
    a second member comprises a connecting side-wall portion which overlies said connecting upright portion and a plurality of locking projections provided to extend inwards from an inner side surface of the connecting side-wall portion,
    wherein said a plurality of locking flanges comprise no groove, and bottom faces thereof distend downwards in a convex curved shape and are continuously arranged so that a continuous track is formed along a circumferential direction of said connecting upright portion, and when said second member overlies said first member to be rotated, upper faces of said locking projections slide and contact with convex curved bottom faces of said locking flanges to be guided on said track and locked at a lowermost position of the convex curved bottom faces;
    wherein the locking flange is not held between two locking projections of the second member in a locked position;
    wherein a lower end of the locking projection is not in contact with the first member while the second member is rotating with respect to the first member, and
    wherein the plurality of locking flanges are provided in positional relationship to be reciprocally engageable with said locking projections, and each of the groups of locking flanges is continuously arranged so that all convex curved bottom faces form a continuous track along the circumferential direction of said connecting upright portion, and formed so that a dimension from an upper end surface of said connecting upright portion to the lowermost position of said convex curved bottom faces varies according to groups of locking flanges.

2. The connecting structure as set forth in claim 1, wherein said locking flanges are formed in a convex curved shape so that an outer edge shape thereof is extended most outwards at said lowermost position and formed in a symmetrical shape centering around said lowermost position.

3. The connecting structure as set forth in claim 1, wherein said first member further comprises a plurality of concave curved joint surfaces formed according to shape and position of the convex curved bottom faces of said plurality of locking flanges at a base-side circumferential part of the connecting upright portion, and said second member further comprises a plurality of convex curved joint surfaces formed according to shape and position of said concave curved joint surface on bottom faces of the connecting side-wall portion.

4. A connecting structure which connects a first member and a second member, wherein:
    a first member comprises a connecting upright portion which is projected in a substantially cylindrical shape and comprises two or more groups of locking flanges whose locking forces vary, composed of a plurality of locking flanges provided to extend outwards along a circumferential direction of an outer side surface of the connecting upright portion; and
    a second member comprises a connecting side-wall portion which overlies said connecting upright portion and a plurality of locking projections provided to extend inwards from an inner side surface of the connecting side-wall portion,
    wherein said a plurality of locking flanges comprise no groove, and bottom faces thereof distend downwards in a convex curved shape and are continuously arranged so that a continuous track is formed along a circumferential direction of said connecting upright portion, and when said second member overlies said first member to be rotated, upper faces of said locking projections slide and contact with convex curved bottom faces of said locking flanges to be guided on said track and locked at a lowermost position of the convex curved bottom faces;
    wherein the locking projection is located on a lowermost surface of the second member;
    wherein the first member is not provided with a part which contacts with a lower end of the locking projection in a locked position; and
    wherein the plurality of locking flanges are provided in positional relationship to be reciprocally engageable with said locking projections, and each of the groups of locking flanges is continuously arranged so that all convex curved bottom faces form a continuous track along the circumferential direction of said connecting upright portion, and formed so that a dimension from an upper end surface of said connecting upright portion to the lowermost position of said convex curved bottom faces varies according to groups of locking flanges.

5. The connecting structure as set forth in claim 4, wherein said locking flanges are formed in a convex curved shape so that an outer edge shape thereof is extended most outwards at said lowermost position and formed in a symmetrical shape centering around said lowermost position.

6. The connecting structure as set forth in claim 4, wherein said first member further comprises a plurality of concave curved joint surfaces formed according to shape and position of the convex curved bottom faces of said plurality of locking flanges at a base-side circumferential part of the connecting upright portion, and said second member further comprises a plurality of convex curved joint surfaces formed according to shape and position of said concave curved joint surface on bottom faces of the connecting side wall portion.

\* \* \* \* \*